(12) United States Patent
Suzuki et al.

(10) Patent No.: US 10,009,199 B2
(45) Date of Patent: Jun. 26, 2018

(54) DATA RECEPTION DEVICE

(71) Applicant: CerebrEx, Inc., Osaka-shi, Osaka (JP)

(72) Inventors: Shinya Suzuki, Osaka (JP); Kenzo Konishi, Osaka (JP); Hideo Nagano, Osaka (JP); Masahiro Kato, Osaka (JP)

(73) Assignee: CEREBREX, INC., Osaka (JP)

( * ) Notice: Subject to any disclaimer, the term of this patent is extended or adjusted under 35 U.S.C. 154(b) by 6 days.

(21) Appl. No.: 15/592,204

(22) Filed: May 11, 2017

(65) Prior Publication Data

US 2017/0331651 A1 Nov. 16, 2017

(30) Foreign Application Priority Data

May 12, 2016 (JP) .................................. 2016-096531

(51) Int. Cl.
*H04L 25/03* (2006.01)
*H04L 7/00* (2006.01)

(52) U.S. Cl.
CPC ...... *H04L 25/03885* (2013.01); *H04L 7/0016* (2013.01); *H04L 7/0079* (2013.01)

(58) Field of Classification Search
CPC ............ H04L 25/03885; H04L 7/0079; H04L 25/03949; H04L 27/01; H04L 7/0004; H04L 7/0016
USPC ......................... 375/236, 371–376, 232–233
See application file for complete search history.

(56) References Cited

U.S. PATENT DOCUMENTS

| 9,467,314 B1* | 10/2016 | Wei ................... H04L 25/03057 |
| 2007/0164802 A1* | 7/2007 | Rea .......................... H03F 3/505 327/266 |
| 2008/0192814 A1* | 8/2008 | Hafed .............. G01R 31/31711 375/224 |
| 2009/0290671 A1* | 11/2009 | Rea ..................... H04L 25/0272 375/371 |
| 2010/0054383 A1* | 3/2010 | Mobin ................... H04L 7/0337 375/371 |
| 2011/0299585 A1* | 12/2011 | Tomita .............. H04L 25/03057 375/236 |

(Continued)

FOREIGN PATENT DOCUMENTS

| JP | A H11-317732 A | 11/1999 |
| JP | A 2008-099017 A | 4/2008 |

(Continued)

*Primary Examiner* — Emmanuel Bayard
(74) *Attorney, Agent, or Firm* — Pyprus Pte Ltd

(57) ABSTRACT

A data reception device includes: an equalizer circuit that shapes a waveform of an input signal according to a set gain value; a CDR circuit which recovers a plurality of clock signals having different phases in one cycle from the input signal after being subjected to the waveform shaping performed by the equalizer circuit; an oversampler which performs sampling of the waveform-shaped input signal in synchronization with the plurality of clock signals and recovers a plurality of input data from the waveform-shaped input signal; and a calibration control unit which determines whether the oversampler correctly recovers the input data based on a result of the sampling performed by the oversampler, and generates a control signal to set the gain value of the equalizer circuit based on a determination result when it is determined that the input data is not correctly recovered.

6 Claims, 21 Drawing Sheets

(56) References Cited

U.S. PATENT DOCUMENTS

| | | | | |
|---|---|---|---|---|
| 2012/0257652 A1* | 10/2012 | Malipatil | ............. | H04L 7/0062 |
| | | | | 375/219 |
| 2013/0271193 A1* | 10/2013 | Keith | ................... | H03L 7/0812 |
| | | | | 327/158 |
| 2015/0180642 A1* | 6/2015 | Hsieh | ................... | H04L 7/0025 |
| | | | | 375/233 |
| 2015/0256154 A1* | 9/2015 | Yokokawa | ............ | H03L 7/0805 |
| | | | | 375/219 |

FOREIGN PATENT DOCUMENTS

| JP | A 2014-062972 A | 4/2014 |
|---|---|---|
| JP | A 2014-171098 A | 9/2014 |

\* cited by examiner

OVERSAMPLER CIRCUIT EXAMPLE 1

OVERSAMPLER CIRCUIT EXAMPLE 2

OVERSAMPLER CIRCUIT EXAMPLE 3

OVERSAMPLER CIRCUIT EXAMPLE 4

OVERSAMPLER CIRCUIT EXAMPLE 5

OVERSAMPLER CIRCUIT EXAMPLE 6

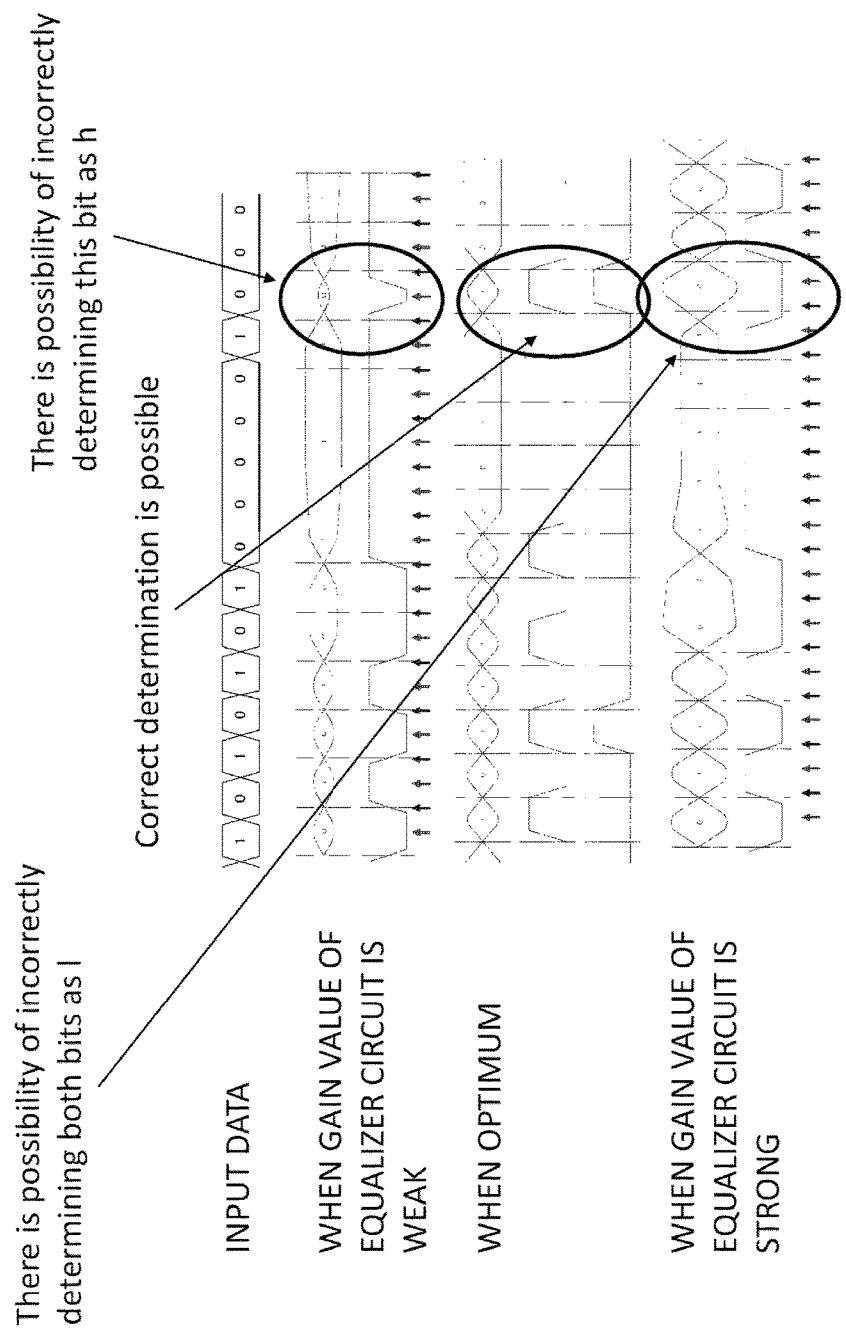

DATA RECEPTION DEVICE

BACKGROUND

Technical Field

The present invention relates to a data reception device in an interface for transmitting image data to a liquid crystal panel module at high speed.

Related Art

In a market for mobile devices such as laptop PC and tablet PC, there always is a request for reduction in power consumption and cost. Meanwhile, a data processing amount and an operating frequency have steadily increased along with improvement of resolution of a panel and improvement of image quality of a display, and the reduction of the power consumption and the cost reduction have become major problems which conflict thereto.

As flow of drawing data to the panel in the laptop PC or the tablet PC, it is configured to use a processor such as a central processing unit (CPU) and a graphics processing unit (GPU) that are in charge of calculation of the drawing data itself, various calculation processing and graphics processing, a timing controller (TCON) that performs timing control and image processing of the panel using the drawing data, sent from the processor such as the CPU and the GPU, as input, and a source driver (SD) that outputs the drawing data in an analog manner according to specification of the panel using the drawing data from the timing controller as input.

Low-voltage-differential-signaling (LVDS) has been widely used for transmission of video data from the CPU or the GPU to the timing controller of the panel. In recent years, however, an embedded display port (eDP) prescribed by the video electronics standard association (VESA) has been mainly adopted. In the eDP, the drawing data is received through a Main-Link, and control data other than video data is received through an AUX-CH from the CPU or the GPU. The standard of eDP is configured of the Main-Link and the AUX-CH, the Main-Link is a high-speed differential serial line operating at a bit rate of from 1.62 Gbps at a minimum to 8.1 Gbps at a maximum per differential lane (pair), and the AUX-CH is a low-speed differential serial line operating at 1 Mbps.

Further, mobile industry processor interface alliance (mipi)-digital serial-interface (DSI) is used as an interface between the CPU or the GPU and the timing controller in a tablet terminal and the like, which is similar to the eDP. The data processing amount and the frequency have steadily increased along with the improvement of resolution of the panel even in the tablet terminal, and the power consumption becomes a major problem. The mipi-DSI has been widely used as a replacement for the LVDS similarly to the eDP.

In addition, mini-LVDS or the like has been widely adopted as an interface between the timing controller and the source driver. In a recent high-resolution display panel, however, the mini-LVDS has been hardly used because a screw, which is a gap in timing on a transmission path generated when a clock line as a reference signal and a transmission data line are separated, becomes a problem. For this reason, a point-to-point (P2P) type 1:1 transmission scheme, that is, a clock embedded scheme in which a clock and data are superimposed on each other is mainly used (JP 2014-062972 A).

In the case of a 4K2K panel, for example, eight source drivers and one timing controller are mainly used for transmission between the timing controller and the source driver, the timing controller and one source driver are connected only by one lane and the other source drivers are not connected to the timing controller as in the mini-LVDS in the P2P transmission, and thus, it is possible to eliminate branches (stubs) on the transmission path. Further, the clock line is superimposed on the data line without being additionally provided in the P2P, so that it is not necessary to consider the timing skew between the clock and the data, and transmission speed can be improved.

In this manner, an eDP interface, a mipi interface, and a P2P interface have been conventionally known in the market for the laptop PC and the tablet PC.

SUMMARY

As described above, the timing controller and the source driver are separated in many cases in the market for the laptop PC and the tablet PC. For example, one timing controller and four source drivers are required in many cases in the case of a full-HD (FHD) panel. In addition, one timing controller and eight source drivers are required in many cases in the case of the 4K2K panel. Furthermore, a flexible printed cable (FPC) for connection between the timing controller and the source driver is required as many as the number of source drivers so that the number of parts has increased along with the increase of resolution of the panel, which causes an increase in cost. Furthermore, it is absolutely necessary to provide the interface between the timing controller and the source driver, and thus, power consumption of the interface is required. Based on such a background, it has been difficult to reduce the cost and the power consumption.

Meanwhile, a so-called system driver in which a timing controller and a source driver are configured as one chip as illustrated in in FIG. 17 is implemented in some tablet PCs and the like. When the system driver is implemented, the number of parts is reduced so that the cost can be reduced. Furthermore, since there is no interface between the timing controller and the source driver, the power consumption can be also reduced. However, the system driver is mounted on a glass of a liquid crystal panel similarly to the source driver. In addition, drawing data is directly input to the system driver from the CPU or the GPU via the eDP interface or the mipi interface. However, a wiring on the glass has a high parasitic resistance, and thus, it is difficult to improve an operating frequency in the case of a gigabit-class serial high-speed interface such as the eDP and the mipi, which makes the increase of resolution difficult. In addition, a configuration in which the system driver of the panel is driven directly from the CPU or the GPU is also conceivable. Even in this case, however, it is difficult to achieve high resolution due to noise on the transmission line of the cable and fluctuations in power supply.

In addition, the clock embedded scheme in which the clock lane is superimposed on the data lane is adopted in the gigabit-class serial high-speed interface such as the eDP as described above. A clock signal is embedded in input data in communication using the clock embedded scheme, and thus, it is necessary to provide a so-called analog front-end circuit (physical layer) on the timing controller side to separate a clock and data from the an eDP serial signal received from the CPU or the GPU and convert the serial signal into a parallel signal so as to enable internal signal processing.

Here, a circuit diagram of an analog front-end unit is illustrated in FIG. 18. As illustrated in FIG. 18, a configuration of the analog front-end circuit includes an equalizer circuit, a clock data recovery (CDR) circuit, and a de-serializer. The equalizer shapes a waveform of an input signal (serial data) whose harmonic component is distorted in a transmission line. The CDR circuit is positioned at the rear stage of the equalizer circuit and generates a clock signal synchronized in timing with input data from the input signal shaped by the equalizer circuit. The de-serializer is positioned at the rear stage of the CDR circuit, converts the serial data into parallel data and passes the parallel data to a logic circuit.

However, in the case of the conventional analog front-end circuit configuration, the operation is performed at operation speed in a range between 1.62 Gbps and 8.1 Gbps in the high-speed serial interface such as the eDP, and thus, signal quality greatly deteriorates due to a glass wiring resistance. In addition, it is difficult for the equalizer circuit and the CDR circuit to properly operate in environment where a large power supply drop is generated even in a power supply and a ground line due to the parasitic resistance. In addition, there is a case where a contact resistance for mounting the IC on the glass changes over time, and the resistance value thereof may increase in some cases.

In addition, a role of the equalizer circuit in the analog front-end circuit will be described. As illustrated in FIG. 19, it is known that the signal quality is degraded at a receiving end because a high frequency component of a signal is reduced due to the influence of the parasitic resistance and a parasitic capacitance in the transmission line. The equalizer circuit plays a role of correcting such reduction of the high frequency component. The equalizer circuit has a positive gain (amplifying action) with respect to a specific high frequency component of a signal, and an amplification effect varies depending on a setting value of the gain.

As illustrated in FIG. 19, a number of "1" (High) and a number of "0" (Low) are aligned to some extent in serial data input in the high-speed serial interface such as the eDP when seen for a certain period, thereby forming a so-called DC-balanced signal. However, there is a case where "1" continues or "0" continues for a certain period other than a case where "1" and "0" alternately continue in a constant manner as in "1010". A DC level of a signal component is close to a high level after "1" continues for a certain period of time, and thus, there is a problem that it is difficult for the subsequent "0" data to be inverted to a low level. On the contrary, the DC level is close to the low level after "0" continues for a certain period, and thus, there is a problem that it is difficult for the subsequent "1" data to be inverted to the high level.

Further, it is widely known that inter-symbol interference jitter (ISI Jitter) increases, as illustrated in FIG. 20, in the inverted data (data of 0 or 1) continued after "1" or "0" continues for a certain period as compared to the case where "1" and "0" are alternately and repeatedly changed in a constant manner such as "1010".

Further, as illustrated in FIG. 21, a waveform of output from the equalizer circuit is disturbed regardless of whether the gain value of the equalizer circuit is too strong or weak, and it is difficult to correctly perform recovery of the signal in the CDR circuit at the subsequent stage. For example, if the gain value of the equalizer circuit is too weak, the output waveform thereof has a time axis direction of the signal shorter than the original time, which makes it impossible to correctly determine the logic level. On the other hand, if the gain value of the equalizer circuit is too strong, the output waveform thereof has the time axis direction of the signal longer than the original time, which makes it impossible to correctly determine the logic level.

Further, an optimum gain value in the equalizer circuit changes depending on a power supply fluctuation, a temperature fluctuation, and a manufacturing variation of a chip in a high-speed interface of a gigabit class such as the eDP. A gain value in a state where the power supply drop is large differs from an optimum gain level when the power supply drop is small. In addition, a gain value when the temperature is high differs from the optimum gain value when the temperature is low. The same description is applied for a manufacturing variation of a semiconductor. However, it is difficult for a gain setting value of the equalizer circuit to dynamically follow an environmental variation factor that dynamically changes due to such ambient environment in the conventional technology, and thus, there is a limitation in increasing a bit rate.

In this manner, it is possible to increase the speed if the gain value of the equalizer circuit can be dynamically controlled. That is, the present invention has been made to solve such problems, and an object of the present invention is to provide a mechanism to dynamically control an equalizer gain of an analog front-end unit in a receiver circuit such as an eDP or an mipi so as to realize a high-speed operation of a single-chip system driver even in operating environment of being mounted on a glass and having a high parasitic resistance, thereby achieving both low power consumption and low cost of a liquid crystal panel module and the like.

The present invention relates to a data reception device capable of dynamically controlling a gain value of an equalizer circuit. Basically, the data reception device of the present invention communicates with a processor such as a CPU and a GPU by a clock embedded scheme in which a clock signal and a component of input data are superimposed on each other in an input signal. The data reception device according to the present invention includes the equalizer circuit, a clock data recovery (CDR) circuit, an oversampler, and a calibration control unit. The equalizer circuit shapes a waveform of the input signal according to a set gain value. During a normal operation, the CDR circuit recovers one clock signal from the input signal after being subjected to the waveform shaping performed by the equalizer circuit. On the other hand, the CDR circuit recovers a plurality of clock signals, which have different phases in one cycle, from the input signal shaped by the equalizer circuit during a calibration operation. During the calibration operation, the oversampler samples an input signal after being subjected to the waveform shaping performed by the equalizer circuit in synchronization with the plurality of clock signals recovered by the CDR circuit, and recovers a plurality of input data from the input signal after being subjected to the waveform shaping. During the calibration operation, the calibration control unit determines whether or not the oversampler has correctly recovered the input data based on a result of the sampling performed by the oversampler. In the case of determining that the input data has not been correctly recovered, a control signal to set the gain value of the equalizer circuit is generated based on the determination result. For example, an input signal representing input data of a known code pattern is input to the data reception device. The calibration control unit analyzes the code pattern of the plurality of input data recovered by the oversampler, determines that the oversampler has correctly recovered the input data when the number of code patterns matching the known code pattern exceeds a predetermined value (expected value), and determines that the oversampler has not correctly recovered the input data when the number falls below the predetermined value. Then, when the input data has been not correctly recovered, the calibration control unit generates a control signal to adjust the gain value of the equalizer circuit based on a sampling result.

As described above, the equalizer circuit can correct signal deterioration of the high frequency component of the transmission line and has the positive gain (amplifying action) with respect to the specific high frequency component of the signal. In addition, the amplification effect varies depending on the gain setting value. As described above, the output waveform of the equalizer circuit is disturbed regardless of whether the gain value of the equalizer circuit is too strong or weak, and it is difficult to correctly recover the signal by the CDR circuit at the subsequent stage. In addition, the optimum gain value of the equalizer circuit varies depending on the power supply fluctuation, the temperature fluctuation and the manufacturing variation of the chip. For example, the optimum gain value in the state where the power supply drop is large differs from the optimum gain value when the power supply drop is small. In addition, an optimum gain value when temperature is high differs from an optimum gain level when the temperature is low. The same description is applied for a manufacturing variation of a semiconductor. Conventionally, however, it is difficult for the gain setting value of the equalizer circuit to dynamically follow such a dynamically changing environmental variation factor, and thus, there is a limitation in increasing the bit rate. The present invention has been made to solve such a problem, and realizes a feedback loop in which a sampling result of input data is determined by the calibration control circuit to be described later, and a gain of the equalizer circuit is set to an optimum value. As a result, it is possible to realize an increase in transmission speed and stabilization of transmission quality.

The data reception device of the present invention further includes a skew adjustment circuit. During the normal operation, the skew adjustment circuit adjusts a shift amount between a phase of the input signal after being subjected to the waveform shaping performed by the equalizer circuit and a phase of one clock signal recovered by the CDR circuit. Here, the above-described calibration control unit decides a predetermined phase based on a result of sampling by the oversampler, and sends control information on the predetermined phase to the skew adjustment circuit. Then, the skew adjustment circuit adjusts the phase of one clock signal recovered by the CDR circuit so as to match the predetermined phase in the control information received from the calibration control unit.

An effect of the skew adjustment circuit will be described. As described above, the data receiving circuit of the present invention has the CDR circuit. The CDR circuit is a circuit that generates a clock signal synchronized in timing with an input signal (serial data) from input thereof. As described above, the CDR circuit can be realized by a phase locked loop (PLL). Although the sampler during the normal operation samples a data signal as output from the equalizer circuit and a clock signal as output from the PLL, a delay from the equalizer circuit to the sampler varies depending on the power supply fluctuations, the temperature fluctuations, and the semiconductor manufacturing variation no matter how carefully a layout is designed. Influence that the delay (timing skew) between the data signal and the clock signal gives on a timing budget becomes more serious as the operation speed becomes faster, which becomes one factor that hinders the increase in speed. The present invention has been made in order to solve such a problem, and a setting value of the timing skew of the CDR circuit is dynamically optimized by determining the sampling result of the input data using the calibration control circuit. As a result, it is possible to realize the increase in transmission speed and the stabilization of transmission quality.

In the data reception device of the present invention, it is preferable that the CDR circuit include a voltage-controlled oscillation circuit (VCO) having a loop circuit in which a plurality of logic inversion elements are connected in series. That is, the CDR circuit can be realized using a phase locked loop (PLL) which has a ring oscillator type voltage-controlled oscillation circuit. In this case, each of the voltage-controlled oscillation circuits outputs a plurality of clock signals having different phases in one cycle. For example, an inverter circuit, a differential amplifier circuit, or the like can be used as the logic inversion element.

In the data reception device of the present invention, the oversampler may include a clock selector, which is connected to a plurality of logic inversion elements forming the voltage-controlled oscillation circuit, activates any one of the plurality of logic inversion elements, and receives input of a clock signal, and a flip-flop which is connected to the clock selector and the equalizer circuit. With such a configuration, the oversampler can sample the input data that is synchronized in timing with the clock signals having phases different little by little, in a time division manner, which can simplify the configuration of the entire device.

In the data reception device of the present invention, the oversampler may include a plurality of the flip-flops which are connected to each of the equalizer circuit and the plurality of logic inversion elements. With such a configuration, the oversampler can perform sampling of all the clocks at once, and thus, it is possible to shorten sampling time.

In the data reception device of the present invention, the oversampler may include a clock selector, which receives input of a clock signal via a delayer connected to a final stage of the voltage-controlled oscillation circuit, and the flip-flop connected to the clock selector and the equalizer circuit. With such a configuration, the oversampler can perform sampling with a clock delayed by a fixed time from an output clock of the voltage-controlled oscillation circuit, and thus, it is possible to simplify design of the oversampler.

It is preferable that the data reception device of the present invention be shifted to the calibration operation periodically even after being shifted from the calibration operation to the normal operation. Further, it is preferable that the data reception device generate the control signal to set the gain value of the equalizer circuit based on the determination result using the calibration control unit when it is determined that the oversampler has not correctly recovered the input data. Accordingly, it is possible to adjust the gain value of the equalizer circuit in real time even after the data reception device is installed in a display panel.

The data reception device of the present invention may include an oscillator and a skew adjustment circuit to adjust a shift amount between the input signal after being subjected to the waveform shaping performed by the equalizer circuit and the clock signal recovered by the CDR circuit according to an oscillation frequency of the oscillator. When such a self-oscillating type oscillator is incorporated in this manner, the skew adjustment circuit can dynamically control the delay (timing skew) between the data signal and the clock signal by monitoring the oscillation frequency of the oscillator.

The present invention can dynamically control the gain value of the equalizer circuit in a display module of a mobile device, such as a laptop PC and a tablet terminal, and the like. For example, it is possible to realize the high-speed operation of the single-chip system driver even in the operating environment of being mounted on the glass and having the high parasitic resistance, and thus, it is possible to achieve both the low power consumption and low cost of the liquid crystal panel module and the like.

BRIEF DESCRIPTION OF DRAWINGS

FIG. 5 illustrates an example where a gain setting value of the equalizer circuit is weak and a waveform of an input signal has not been correctly shaped;

FIG. 6 illustrates an example where the gain setting value of the equalizer circuit is strong and the waveform of the input signal has not been correctly shaped;

FIG. 7 illustrates an example where the gain setting value of the equalizer circuit is appropriate and the waveform of the input signal has been correctly shaped;

FIG. 21 is a diagram for describing that an output waveform from the equalizer circuit fluctuates due to a difference in gain of the equalizer circuit.

DETAILED DESCRIPTION

Hereinafter, embodiments of the present invention will be described with reference to the drawings. The present invention is not limited to the embodiments described below, but includes changes thereto made appropriately by those skilled in the art to the extent obvious. The present invention can be configured by appropriately combining the respective embodiments described below or by independently employing each embodiment. Further, an eDP is exemplified in the description of the embodiments of the present invention, but the same effect can be obtained by replacing the eDP with a mipi, and the present invention is not limited to the eDP.

[First Embodiment of Present Invention]

Figure 1:
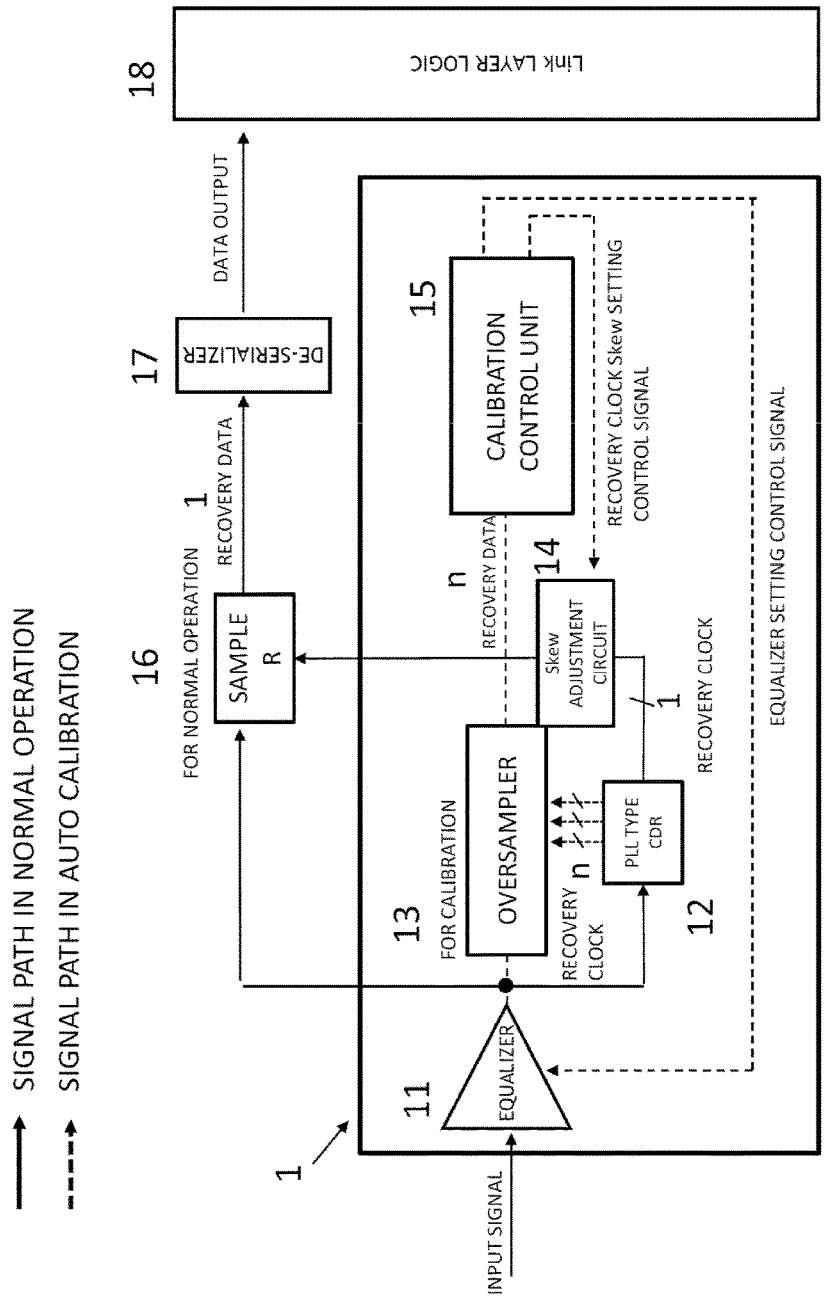
FIG. 1 is a block diagram illustrating a configuration of a data reception device according to an embodiment of the present invention.

A first embodiment of the present invention will be described. FIG. 1 is a block diagram for describing an overall configuration of a data receiving circuit 1 according to the present invention. Here, a basic configuration of the data receiving circuit 1 will be described with reference to FIG. 1.

The data receiving circuit 1 is a circuit incorporated in a timing controller in, for example, a laptop PC or a tablet PC and receives drawing data transmitted from a processor such as a CPU and a GPU. The timing controller is a large-scale integration (LSI) that generates various timing signals so that drawing data transmitted from the processor such as the CPU and the GPU matches a timing of a liquid crystal panel. The interface between the processor and the timing controller conforms to, for example, an eDP standard of VESA. That is, the timing controller receives the drawing data from the processor through a Main-Link (main signal line) which operates at relatively high speed and controls the control data other than video data through an AUX-CH (sub-signal line) which operates at relatively low speed. In the eDP standard, the Main-Link (main signal line) is a high-speed differential serial line which operates at a bit rate of from 1.62 Gbps at a minimum to 8.1 Gbps at a maximum per differential lane (pair). On the other hand, the AUX-CH is a low-speed differential serial line which operates at 1 Mbps. The interface of the drawing data may be a mipi.

As illustrated in FIG. 1, the data receiving circuit 1 of the present invention includes an equalizer circuit 11, a PLL type CDR circuit 12, an oversampler 13, a skew adjustment circuit 14, and a calibration control unit 15. The data receiving circuit 1 may be regarded as a device further including a sampler 16, a de-serializer 17, and a logic circuit 18 during a normal operation. In FIG. 1, signal paths during the normal operation are indicated by solid arrows and signal paths during auto calibration are indicated by broken arrows.

As illustrated in FIG. 1, an input signal to the data receiving circuit 1 is subjected to a waveform shaping process performed by the equalizer circuit 11, and then, input to the CDR circuit 12 and the sampler 16 during the normal operation. A process of recovering a clock signal from the waveform-shaped input signal is performed in the CDR circuit 104. In addition, the sampler 16 recovers the input data from the waveform-shaped input signal to be synchronized in timing with the clock signal (recovery clock) recovered by the CDR circuit 104. The input data (recovery data) recovered by the sampler 16 is input to the de-serializer 17. The de-serializer 17 converts serial data into parallel data and outputs the parallel data to the logic circuit 18.

On the other hand, an input signal to the data receiving circuit 1 is subjected to the waveform shaping process performed by the equalizer circuit 11, and then, is input to the CDR circuit 12 and the oversampler 13 in the auto calibration as illustrated in FIG. 1. In the auto calibration, a process of recovering a plurality of clock signals whose phases are shifted little by little in one cycle (2π) from the waveform-shaped input signal is performed in the CDR circuit 12. Further, the oversampler 13 recovers a plurality of input data from the waveform-shaped input signal to be synchronized in timing with the plurality of clock signals (n recovery clocks; n is an integer of 2 or more) recovered by the CDR circuit 12. The plurality of input data (n recovery data; n is an integer of 2 or more) recovered by the oversampler 13 are input to the calibration control unit 15. The calibration control unit 15 analyzes code patterns of the plurality of input data to determine whether or not the waveform-shaped input signal has been correctly recovered by the oversampler 13, generates a control signal to adjust a gain value of the equalizer circuit 11 based on a determination result, and performs feedback to the equalizer circuit 11. The calibration control unit 15 can generate a control signal to control a skew adjustment value of the skew adjustment circuit 14 based on a sampling result of the input signal after being subjected to the waveform shaping performed by the oversampler 13, and perform feedback to the skew adjustment circuit 14. That is, the skew adjustment circuit 14 has a function of adjusting a shift amount between a phase of the input signal after being subjected to the waveform shaping performed by the equalizer circuit and a phase of one clock signal recovered by the CDR circuit during the normal operation. A predetermined phase is decided based on the result of sampling performed by the oversampler 13, and control information on the predetermined phase is sent to the skew adjustment circuit 14. The skew adjustment circuit 14 adjusts the phase of one clock signal recovered by the CDR circuit 14 so as to match the predetermined phase in the control information received from the calibration control unit 15.

The equalizer circuit is a circuit which shapes a waveform of an input signal according to a set gain value. For example, the equalizer circuit can shape a waveform of an input signal (serial data) in which harmonic components are distorted in a transmission line. Functions and characteristics of the equalizer circuit are the same as those which have been described with reference to FIGS. 18 to 21. The equalizer circuit 11 has a positive gain (amplifying action) with respect to a specific high frequency component of a signal, and an amplification effect varies depending on the gain setting value. A known circuit can be adopted as the equalizer circuit.

The CDR circuit is a circuit which receives output of the equalizer circuit and generates a clock signal which is synchronized in determination timing with input data represented by an input signal from input of the input signal (serial data) after being subjected to the waveform shaping process. In the present invention, the high-speed serial interface such as the eDP is adopted as a communication path between the processor and the data reception device, and the clock line is superimposed on the data line. Thus, it is necessary to extract the clock signal synchronized with the input data from the input signal after being subjected to the waveform shaping process. A phase synchronization circuit (PLL) is generally used as the CDR circuit.

Figure 2:
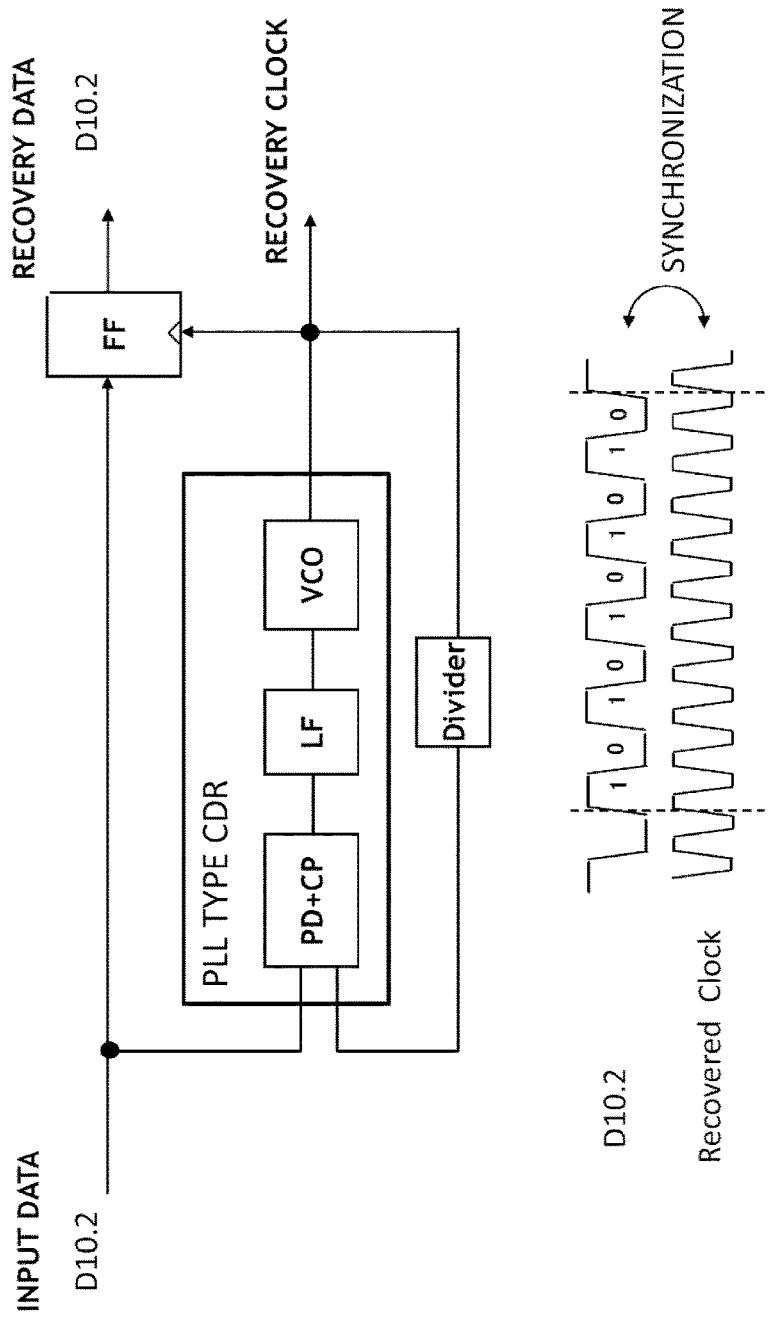
FIG. 2 is a diagram for describing an operation in Step 1 in a link training sequence of an eDP.

FIG. 2 illustrates an example of a configuration of the PLL type CDR circuit. As illustrated in FIG. 2, the PLL type CDR circuit includes a phase comparison circuit (PD), a charge pump circuit (CP), a loop filter (LF), and a voltage-controlled oscillation circuit (VCO). The phase comparison circuit compares the phases of the received data signal and the recovered clock signal and outputs a phase difference signal indicating a phase difference. The charge pump circuit outputs a charge pump current, which corresponds to the phase difference signal output from the phase comparison circuit, to the loop filter. The phase comparison circuit and the charge pump circuit may be configured integrally. The charge pump current from the charge pump circuit is supplied to the loop filter, and the loop filter smoothes the supplied charge pump current and converts the current into a control voltage of the voltage-controlled oscillation circuit. The voltage-controlled oscillation circuit outputs a clock signal (oscillation signal) having a frequency corresponding to the control voltage. When the phase of the recovered clock is advanced with respect to the data signal, the phase comparison circuit, the charge pump circuit, and the loop filter control the control voltage of the voltage-controlled oscillation circuit so as to decrease a frequency of the clock signal output by the voltage-controlled oscillation circuit. On the contrary, when the phase of the recovered clock is delayed with respect to the data signal, the phase comparison circuit, the charge pump circuit, and the loop filter control the control voltage of the voltage-controlled oscillation circuit so as to increase the frequency of the clock output by the voltage-controlled oscillation circuit.

In the present invention, the voltage-controlled oscillation circuit outputs a plurality of clock signals having different phase differences in one clock cycle. For example, when outputting five-phase clock signals having different phases, the voltage-controlled oscillation circuit may output clock signals whose phases are shifted from each other by ⅕ of one cycle ($2\pi$). Since the five-phase clock signals having shifted phases are required in this example, the voltage-controlled oscillation circuit is a ring type VCO which is configured using a loop circuit including five logic inversion elements connected in series. In addition, the voltage-controlled oscillation circuit inputs an analog control voltage which is an output voltage output from the loop filter to output a plurality of clock signals whose phases are shifted little by little by being oscillated at a frequency corresponding to the output voltage.

Here, a sequence called "link training" is executed before the normal operation after start of a power supply in the clock-embedded type high-speed serial interface such as the eDP to which the present invention is applied. The link training has two steps to be described as follows.

A first step in the link training is a step of locking the PLL of the CDR circuit as illustrated in FIG. 2. For example, a signal of a code pattern (for example, D10.2 in ANSI-8B10B standard of the American National Standards Institute) in which High and Low alternately change such as "1010 . . . " is transmitted from the processor so that the PLL of the CDR circuit is locked to a desired clock frequency. The serial data is sampled using the clock signal output from the VCO of the PLL so as to achieve synchronization. In the example illustrated in FIG. 2, a clock pattern (highest frequency: ½ of a data rate) in which "1" and "0" are repeated every bit is set.

Figure 3:
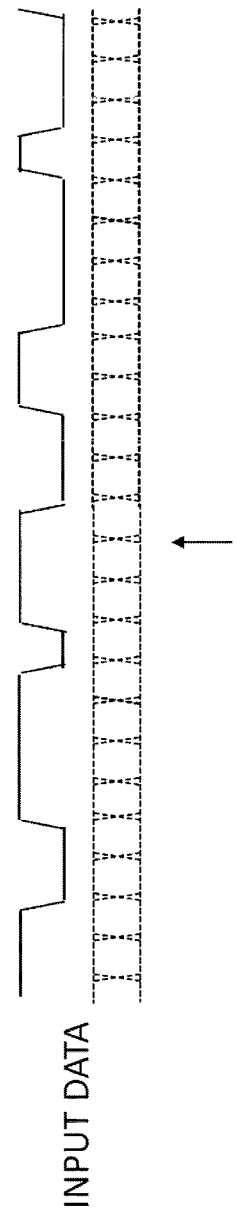
FIG. 3 is a diagram for describing an operation in Step 2 in the link training sequence of the eDP.

A second step in the link training is a step of finding a break in the input serial data. As illustrated in FIG. 3, one packet data is formed of 10 bits in the serial interface such as the eDP, and it is necessary to find a break of 10 bits. Therefore, a specific symbol pattern configured to distinguish the break is transmitted to the data reception device (timing controller) from the processor. Since the PLL of the CDR circuit has already been locked and separated into data and a clock in the first step of the link training, the data reception device can find a break of the data by extracting the data using the logic circuit when the specific symbol pattern is transmitted from the processor to the data reception device in this state. In this manner, after the start of the power supply, the processor can find the break of the 10-bit data by setting the link training sequence to the data reception device (timing controller) and correctly locking the CDR circuit.

Figure 4:
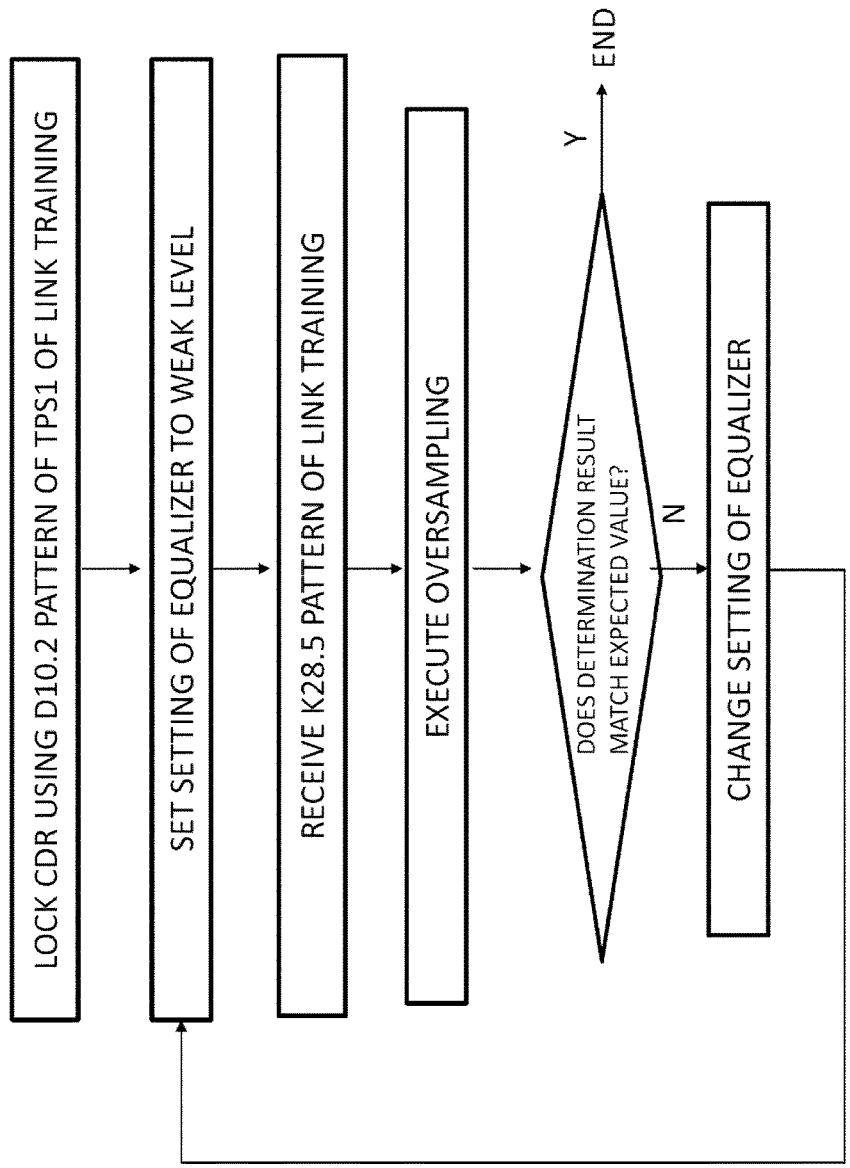
FIG. 4 is a diagram illustrating an overall flow of calibration control of an equalizer circuit.

FIG. 4 illustrates an execution flow of the auto calibration of the equalizer circuit. As illustrated in FIG. 4, the sequence called the link training is executed in the clock-embedded type high-speed serial interface such as the eDP before the normal operation after the start of the power supply. In the first step of the link training, the code pattern of D10.2 is used to lock the CDR circuit to the desired clock frequency. Subsequently, the setting of the gain value of the equalizer circuit is set to a relatively weak level. Subsequently, the second step in the link training is executed. In this case, the break is found by transmitting the specific symbol pattern and extracting the data using the logic circuit. In this symbol lock, for example, a pattern called (K28.5) or (D11.6) is also used as a specific code. In the present invention, the setting of the gain value of the equalizer circuit is optimized using this specific code.

As described above, the high-speed serial signal is known to have ISI jitter in which signal quality of a reception target bit is affected by the time for which the "1" level continues and the time for which the "0" level continues, prior to the reception target bit. It is necessary to decide the gain value of the equalizer circuit in consideration of this influence. Since the influence is greatly affected by variations in power supply, temperature, and a semiconductor process, it is desirable to dynamically set the gain value of the equalizer circuit in consideration of this influence, too. In the present invention, the gain value is set by utilizing a K code which is input during the link training period and which is affected by the ISI jitter. In addition, the contact resistance of the IC mounted on the glass changes with time as described above, and the resistance value may increase in some cases. In view of these phenomena, there is a great limitation on an operating frequency in unique setting of the equalizer circuit set at the time of shipping the IC. Therefore, oversampling is performed during the link training period in order to dynamically set the gain value of the equalizer circuit, and the gain value of the equalizer circuit is dynamically set to an appropriate level based on a result of this sampling in the present invention as illustrated in FIG. 4.

Figure 5:
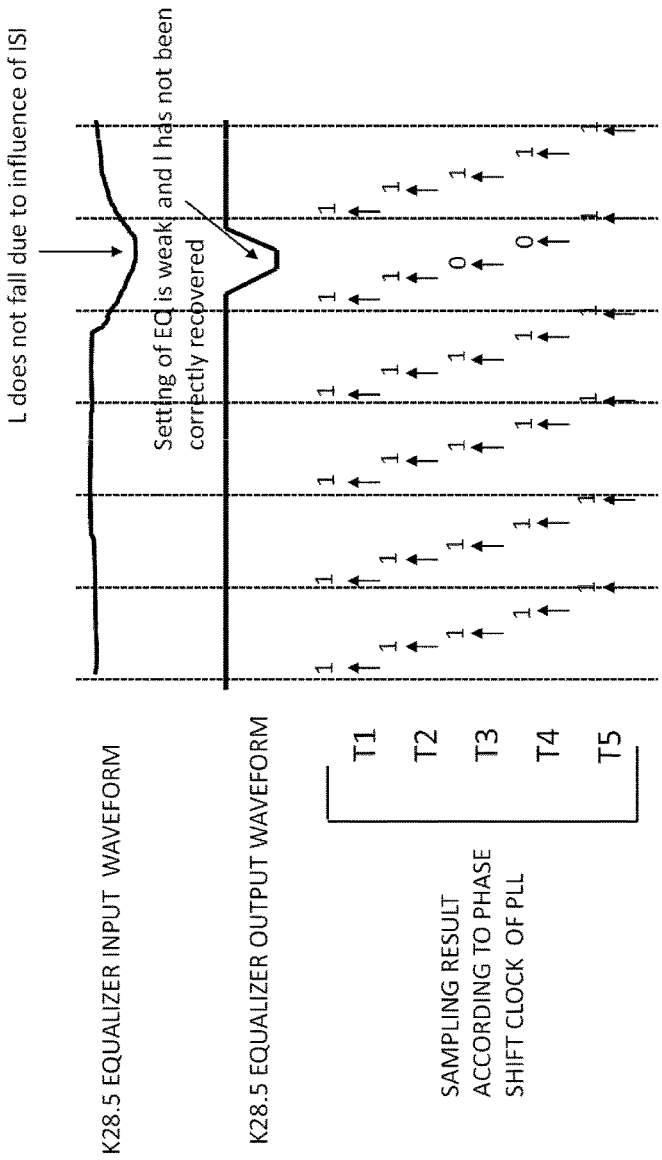
FIG. 5 is a diagram illustrating an oversampling timing in the calibration control of the equalizer circuit.

For example, as illustrated in FIG. 5, the codes such as K28.5 and D11.6 are transmitted from the processor to the timing controller, in addition to D10.2, for a certain period during link training in the eDP. For example, K28.5 is a code pattern of "1100000101" or "0011111010", and D11.6 is a code pattern of "1101000110". In particular, it is possible to say that K28.5 "0011111010" is a pattern in which it is difficult to correctly recover "0" since "0" is generated once after "1" continues for long, and the above-described influence of the ISI is most likely to appear. For example, this K28.5 pattern is taken out from the ring type oscillation circuit (ring oscillator) forming the VCO of the PLL of the CDR circuit, and the K28.5 pattern is sampled using a plurality of clocks having phases shifted little by little in one cycle. In the case of a 5-stage ring oscillator, for example, five-phase clock signals whose phases are shifted from each other by ⅕ of one cycle (2π) are taken out as illustrated in FIG. 5. The code that can be used in the second step of the link training is not limited to K28.5, but may be the above-described D11.6.

First, the gain value of the equalizer circuit is set to be weak, and the specific code pattern (K28.5 in the following description) is sampled for a certain period with a first PLL clock (T1). This state is illustrated in FIG. 5. If the setting of the gain value of the equalizer circuit is too weak, the bit of "0" contained in the code pattern of K28.5 is hardly decreased to the low level so that all sampling results of T1 become "1" without detecting the low level. Comparing the sampling result of T1 with the code pattern of K28.5, it is understood that the correct input data has not been recovered from the input signal. Next, sampling is performed in the same manner with a second PLL clock (T2). All sampling results of T2 also become "1". Next, sampling is performed in the same manner with a third PLL clock (T3). As sampling results of T3, "0" is generated once as the low level can be detected, and "1" is generated as the other results. The same description can be also applied for a fourth PLL clock (T4). Therefore, it is understood that the correct input data has been successfully recovered from the input signal with T3 and T4. On the other hand, all sampling results become "1" without detecting "0" for a PLL clock (T5). The sampling result is determined by the calibration control unit. In the example illustrated in FIG. 5, the recovery of the input data is failed without detecting "0" with the phase clocks of T1, T2, and T5, and the recovery of the input data is succeeded by detecting "0" with the phase clocks of T3 and T4, and thus, it is understood, from the sampling results, that an input waveform is "111101" and that the gain setting of the equalizer circuit is too weak so that "0" has not been correctly recovered.

Figure 6:
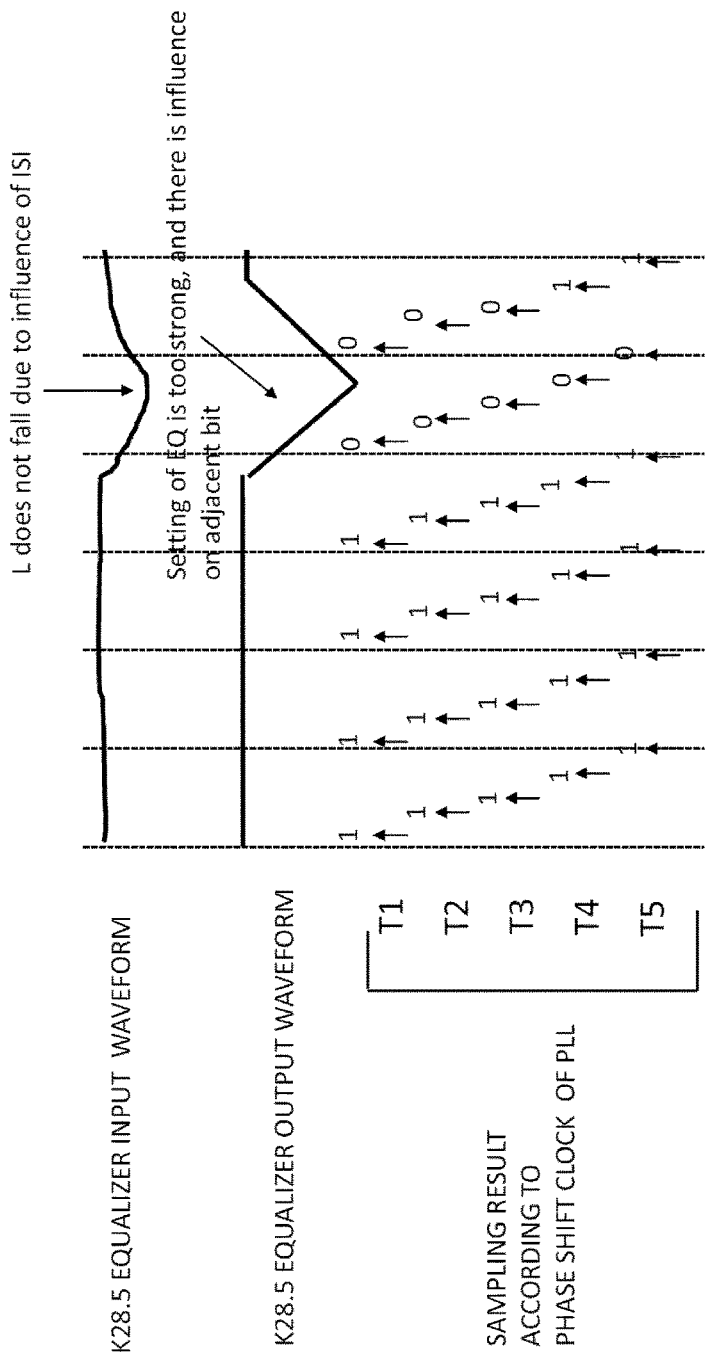
FIG. 6 is a diagram illustrating an oversampling timing in the calibration control of the equalizer circuit.

Next, the gain value of the equalizer circuit is set to be strong, and sampling is performed from T1 to T5 in the same manner. This state is illustrated in FIG. 6. Since the gain value of the equalizer circuit is strong, a waveform after the sampling immediately falls to the low level. For this reason, "0" appears twice, and "1" appears as the other results in T1. Similarly, "0" appears twice, and "1" appears as the other results in T2 and T3. On the other hand, "0" appears only once and "1" appears as the other results in T4 and T5. The sampling result is determined by the calibration control unit. Since "0" has been detected only in T3 and T4, it is understood, from the sampling results, that the input waveform is "111101", and that the gain setting of the equalizer circuit is too strong so that even adjacent bits out of a range of the target bit are affected to be the low level and the high level of the adjacent bits is narrowed.

Figure 7:
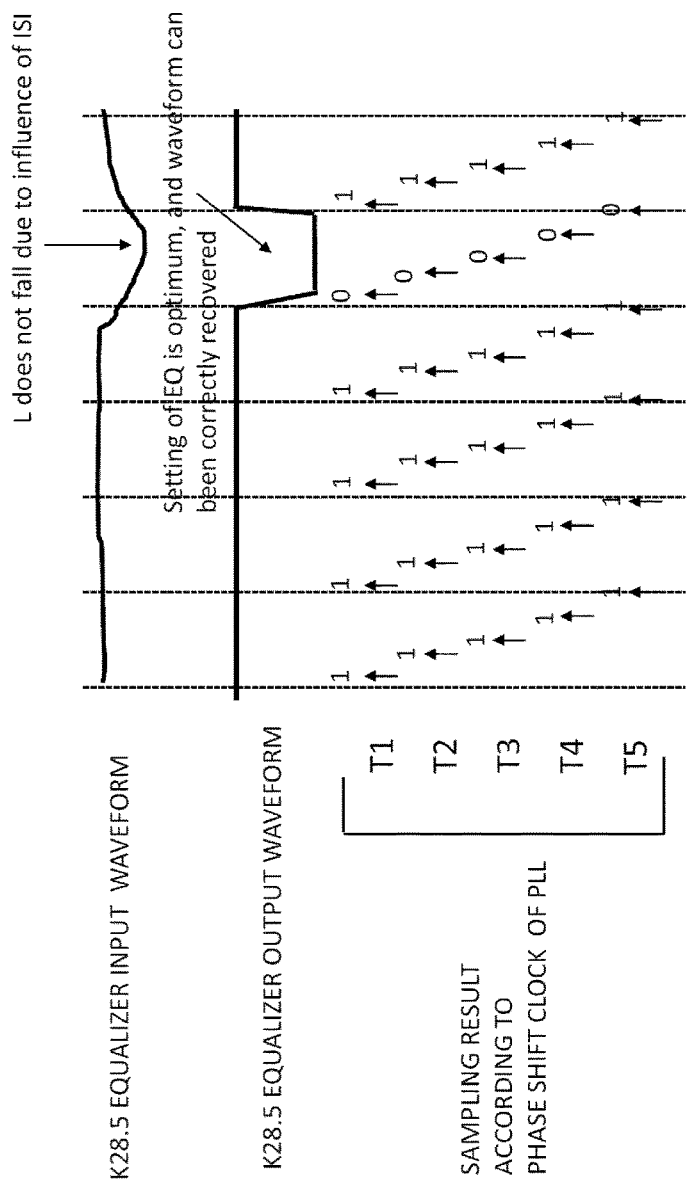
FIG. 7 is a diagram illustrating an oversampling timing in the calibration control of the equalizer circuit.

Next, the gain value of the equalizer circuit is set to an intermediate value between the value illustrated in FIG. 5 and the value illustrated in FIG. 6, and sampling is performed from T1 to T5 in the same manner. This state is illustrated in FIG. 7. Since the gain value of the equalizer circuit is appropriate, the waveform to be sampled falls to the low level at the correct timing. Therefore, "0" appears once, and "1" appears as the other results in all sampling results from T1 to T5. The sampling result is determined by the calibration control unit. From the sampling results, it is understood that the input waveform is "111101", and that the gain value of the equalizer circuit is appropriate, and the gain setting with which "0" of the target bit is correctly recovered and there is no influence on adjacent bits is obtained. In this manner, it is possible to adjust the gain value of the equalizer circuit to an appropriate value by oversampling the waveform of the input signal at a plurality of timings by shifting the phase thereof little by little, and determining the results of the sampling in the auto calibration. In the present embodiment, it is determined that the oversampler has successfully recovered the input data when all of the five pieces of input data are successfully recovered. However, for example, it may be determined that the oversampler has successfully recovered the input data when four or more pieces of input data among five pieces of the input data are successfully recovered. The expected value of the successful recovery can be appropriately changed.

Figure 8:
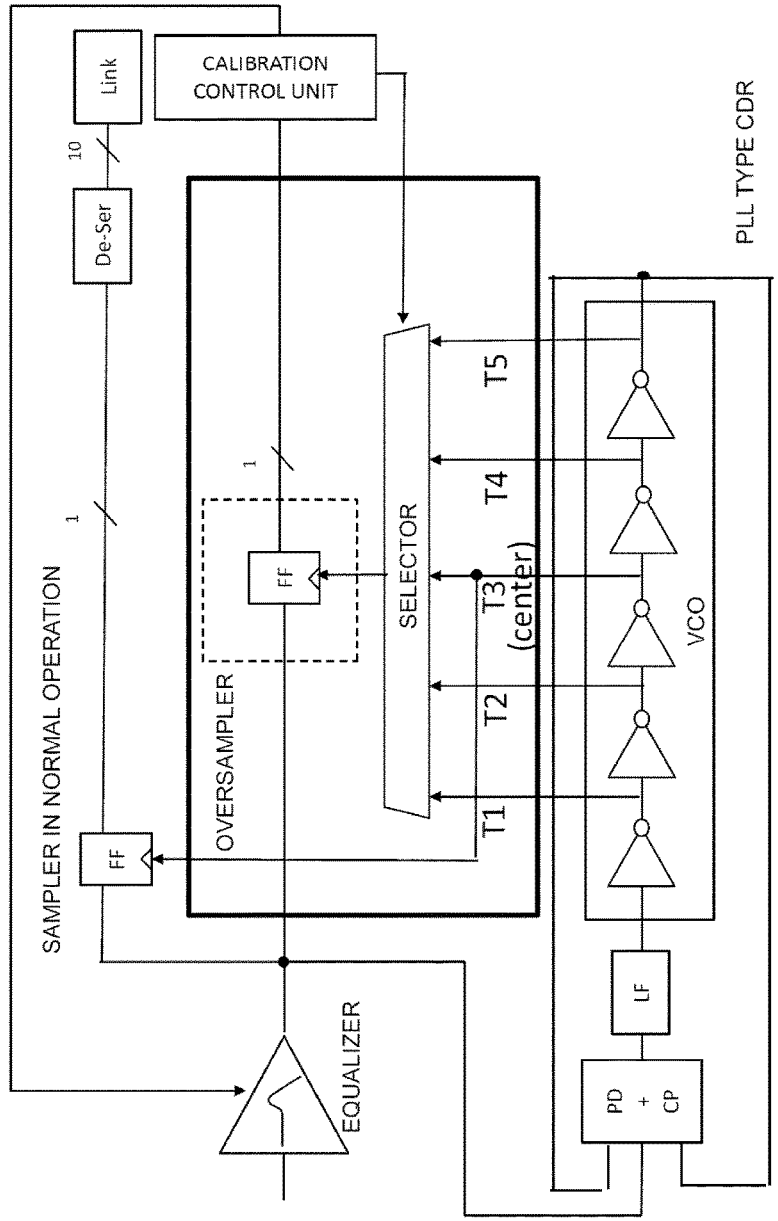
FIG. 8 illustrates a first circuit example of an oversampler.

Next, a circuit example of the oversampler will be described. FIG. 8 illustrates a first circuit example of the oversampler. As described above, the PLL type CDR circuit has the phase comparison circuit (PD), the charge pump circuit (CP), the loop filter (LF), and the voltage-controlled oscillation circuit (VCO). Further, the voltage-controlled oscillation circuit is the ring type VCO which is configured using the loop circuit including the five logic inversion elements connected in series, and outputs the five-phase clock signals (T1 to T5) having different phases in one clock cycle. In the example illustrated in FIG. 8, the logic inversion element is configured using an inverter circuit. However, the logic inversion element is not limited to the inverter circuit, but can be also configured using a differential amplifier circuit, for example. In the example illustrated in FIG. 8, the oversampler is configured of the clock selector connected to the five inverters of the VCO, and the flip-flop connected to the clock selector and the equalizer circuit. The clock selector takes out the clock signal from each stage of the ring oscillator by activating only one of the ring oscillators of the VCO. The flip-flop samples the input signal after being subjected to the waveform shaping performed by the equalizer circuit at the timing synchronized with the clock signal selected by the clock selector, and outputs the obtained input data to the calibration control unit. The calibration control unit is connected to the clock selector and controls the clock selector so as to take out a next phase clock after sampling with one phase clock is completed. Accordingly, the clock selector takes out the five-phase clock signals (T1 to T5) one by one under control performed by the calibration control unit and outputs each taken-out clock signal to the flip-flop, and a result of the sampling in the flip-flop is output to the calibration control unit. Further, the calibration control unit determines the code pattern of five pieces of input data sampled in synchronization with the five-phase clock signals (T1 to T5), and generates a control signal to control the gain value of the equalizer circuit based on the determination result. The calibration control unit feeds back the generated control signal to the equalizer circuit, and the equalizer circuit changes the gain value based on the control signal received from the calibration control unit. An arbitrary one (T3 in the example illustrated in FIG. 8) among the five clock signals that can be output from the VCO is used as a sampler (FF) which is used during the normal operation.

Figure 9:
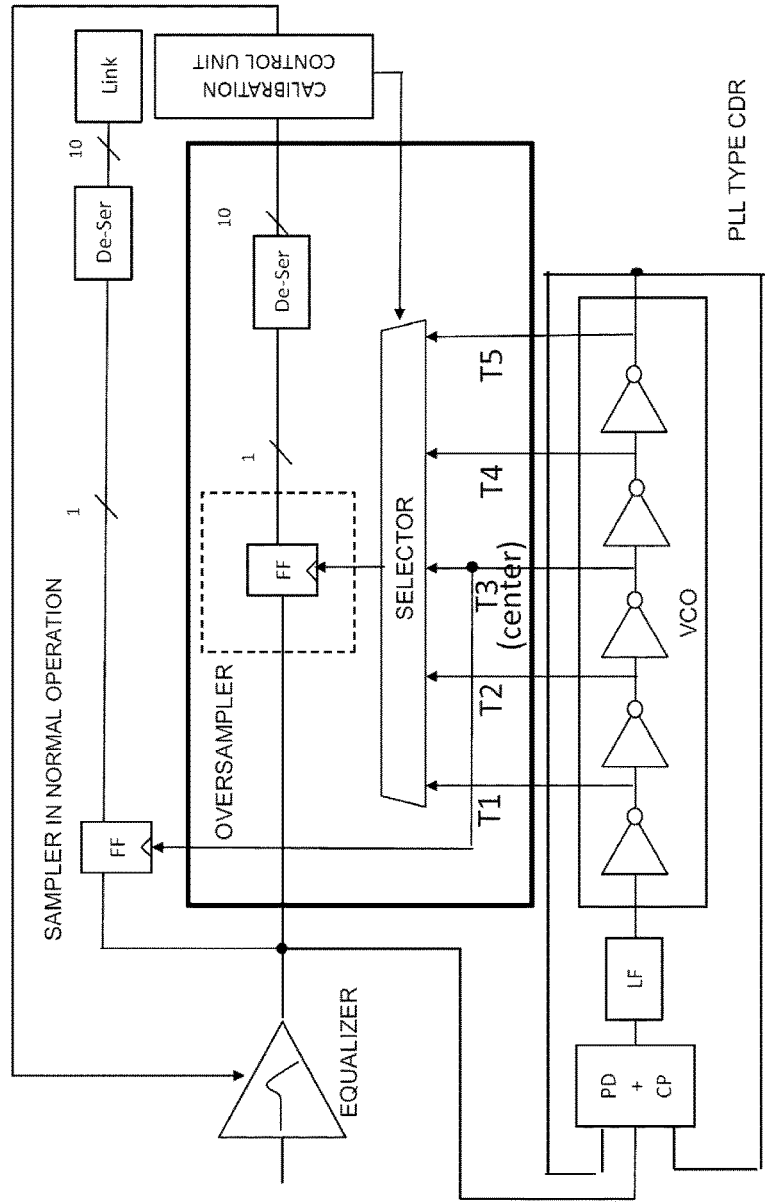
FIG. 9 illustrates a second circuit example of the oversampler.

FIG. 9 illustrates a modification as a second circuit example illustrated in FIG. 8. The second circuit example is a modification of the first circuit example. As illustrated in FIG. 9, the oversampling result in the flip-flop of the oversampler is the high-speed serial signal. Therefore, the de-serializer to be used during the normal operation is incorporated in the oversampler and added to output at the output side of the flip-flop in order to allow the design of the calibration control unit at lower speed. The de-serializer in the oversampler converts a 1-bit serial signal to 10-bit parallel signals. As a result, the calibration control unit only needs to determine a plurality of input data converted to the 10-bit parallel signals, and thus, it is possible to reduce the cost.

Figure 10:
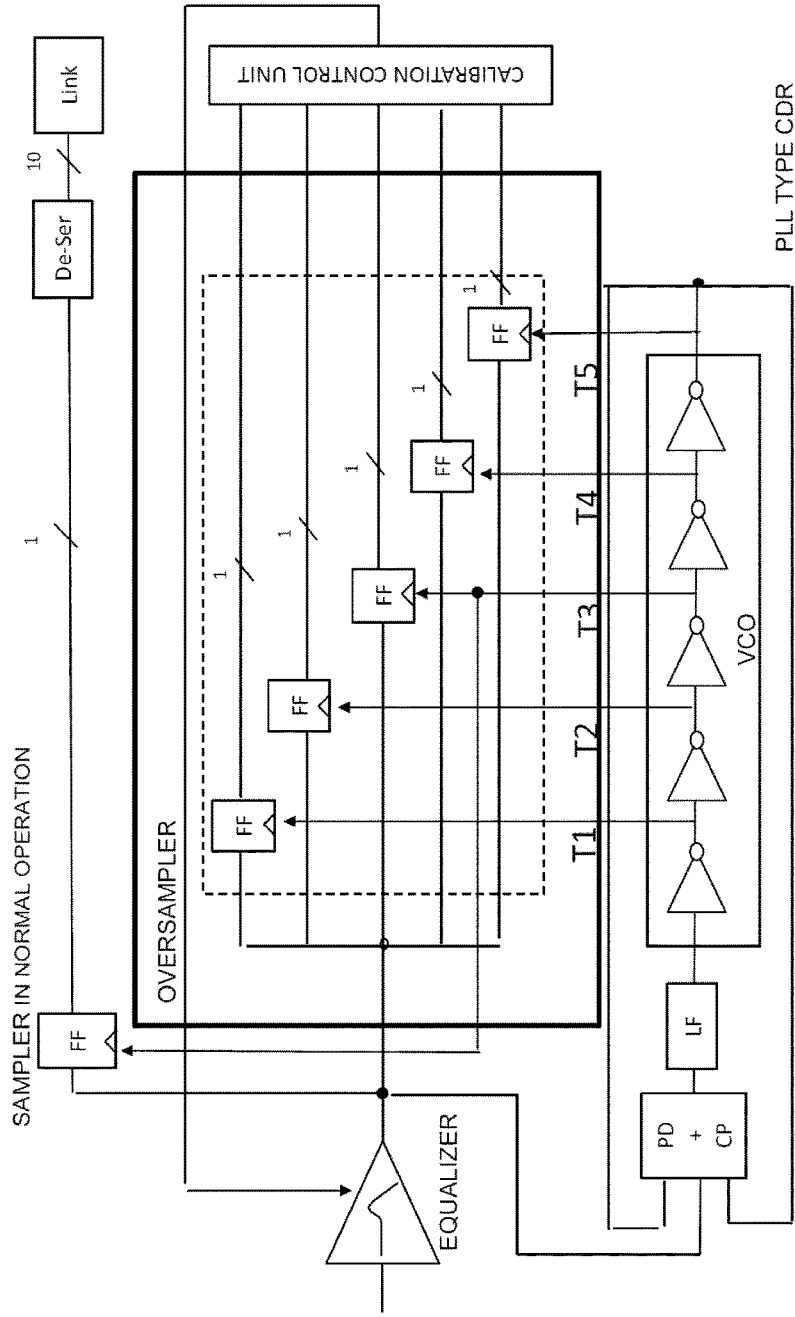
FIG. 10 illustrates a third circuit example of the oversampler.

FIG. 10 illustrates a third circuit example of the oversampler. In the third circuit example, the oversampler has a plurality of the flip-flops. Each of the plurality of flip-flops in the oversampler is connected to each of output terminals of the plurality of inverters forming the VCO. Thus, each of the flip-flops samples the waveform-shaped input signal input from the equalizer circuit at the same time in synchronization with the clock signals having different phases output from the respective stages of each VCO, and outputs the recovered input data to the calibration control unit. In the first circuit example illustrated in FIG. 8, the clock signal to be sampled is switched in a time-division manner. However, the sampling of all the clock signals can be achieved at once in the circuit example illustrated in FIG. 10, and thus, there is an effect that it is possible to shorten the sampling time.

Figure 11:
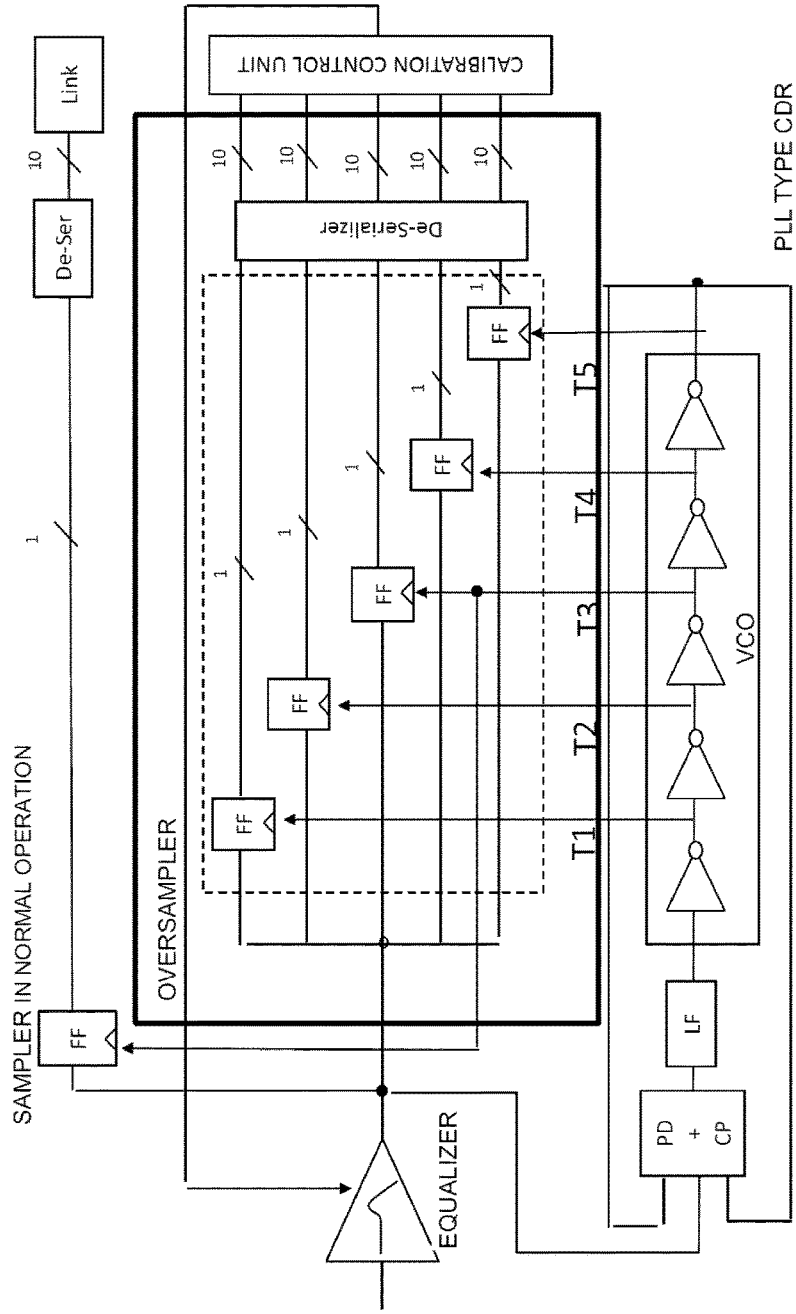
FIG. 11 illustrates a fourth circuit example of the oversampler.

FIG. 11 illustrates a fourth circuit example of the oversampler. The fourth circuit example is a modification of the third circuit example. Since a sampling result obtained by the oversampler is a high-speed serial signal, a de-serializer is added to an output side of each flip-flop, and a 1-bit serial signal is converted into 10-bit parallel signals so as to allow the design of the calibration control unit at lower speed.

Figure 12:
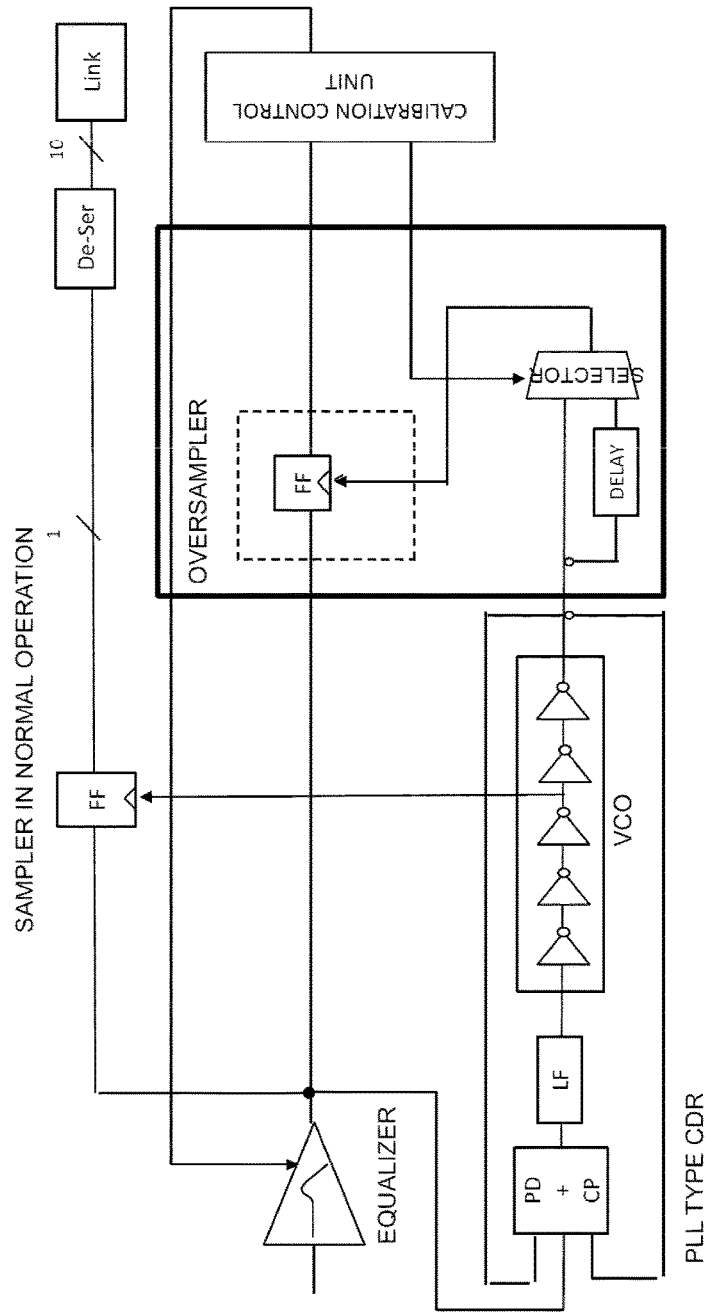
FIG. 12 illustrates a fifth circuit example of the oversampler.

FIG. 12 illustrates a fifth circuit example of the oversampler. In the fifth circuit example, when sampling the input signal from the equalizer circuit, the oversampler does not use the clock signal phase-controlled by the VCO of the PLL, but uses a clock signal delayed by a fixed time from an output clock signal of the VCO to perform the sampling. That is, the oversampler has a clock selector which receives input of a clock signal via a delay device connected to the output terminal of the VOC, and a flip-flop connected to the equalizer circuit and the clock selector. Accordingly, there is an effect of simplifying the design of the oversampler.

Figure 13:
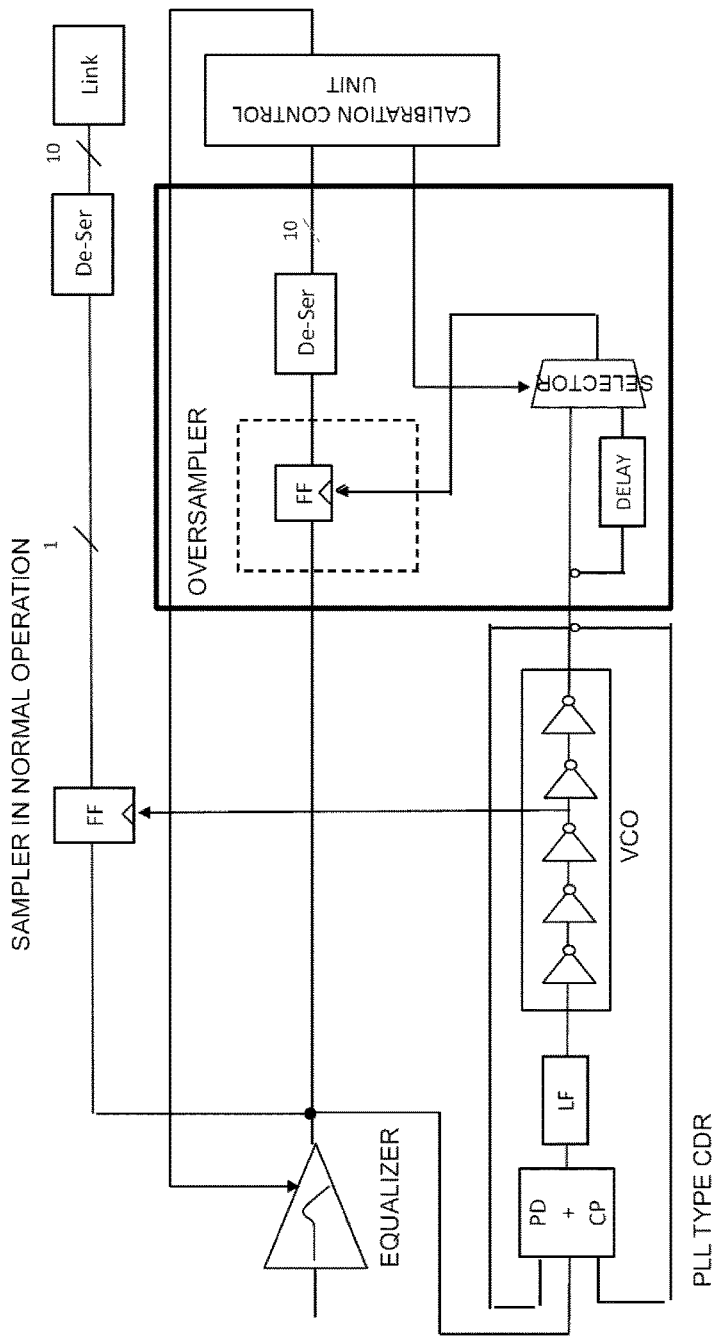
FIG. 13 illustrates a sixth circuit example of the oversampler.

FIG. 13 illustrates a sixth circuit example of the oversampler. The sixth circuit example is a modification of the fifth circuit example. Since a sampling result obtained by the oversampler is a high-speed serial signal, a de-serializer is added to an output side of each flip-flop, and a 1-bit serial signal is converted into 10-bit parallel signals so as to allow the design of the calibration control unit at lower speed.

[Second Embodiment of Present Invention]

A second embodiment of the present invention will be described. The second embodiment of the present invention is given as follows. In the first embodiment described above, the gain level of the equalizer circuit can be optimally set in the link training sequence at the time of starting the power supply. However, a power supply level of the IC fluctuates depending on an operation state, and temperature also fluctuates even after the link training is completed and the operation is shifted to the normal operation. Since such fluctuations in the power supply level and temperature affect characteristics of the equalizer circuit as described above, it is desirable to periodically review (calibrate) the optimum value even after shifting to the normal operation. As described above, the contact resistance of the IC mounted on the glass changes with time, and the resistance value may increase in some cases. In view of these phenomena, there is a great limitation on an operating frequency in unique setting of the equalizer circuit set at the time of shipping the IC.

Therefore, the processor, such as the CPU and the GPU, transmits the specific code pattern which is the same as that in the link training to the timing controller at the beginning of a horizontal blanking period and a vertical blanking period in the eDP. Accordingly, a data reception device according to the second embodiment can execute the same calibration sequence as in the first embodiment not only during the link training period but also during the normal operation. As a result, it is possible to provide a reception device capable of constantly following not only the manufacturing variation of the IC but also the power supply fluctuation and the temperature fluctuation.

[Third Embodiment of Present Invention]

A third embodiment of the present invention will be described. The third embodiment of the present invention is given as follows. As described above, the clock is superimposed on the data line in the high-speed serial interface such as the eDP, and it is necessary to extract the clock synchronized with the data from the serial data input. Therefore, the CDR circuit is the circuit which generates the clock signal synchronized in timing with the data from the serial data input. The CDR circuit is generally configured using the PLL. Although the sampler during the normal operation samples a data signal as output from the equalizer circuit and a clock signal as output from the PLL, a delay from the equalizer circuit to the sampler varies depending on the power supply fluctuations, the temperature fluctuations, and the semiconductor manufacturing variation no matter how carefully a layout is designed. Influence that the delay (timing skew) between the data signal and the clock signal gives on a timing budget becomes more serious as the operation speed becomes faster, which becomes one factor that hinders the increase in speed. Therefore, a phase relationship between the data recovered by the CDR circuit and the clock is automatically set such that there is a largest timing margin in the sampler circuit in the third embodiment.

Figure 14:
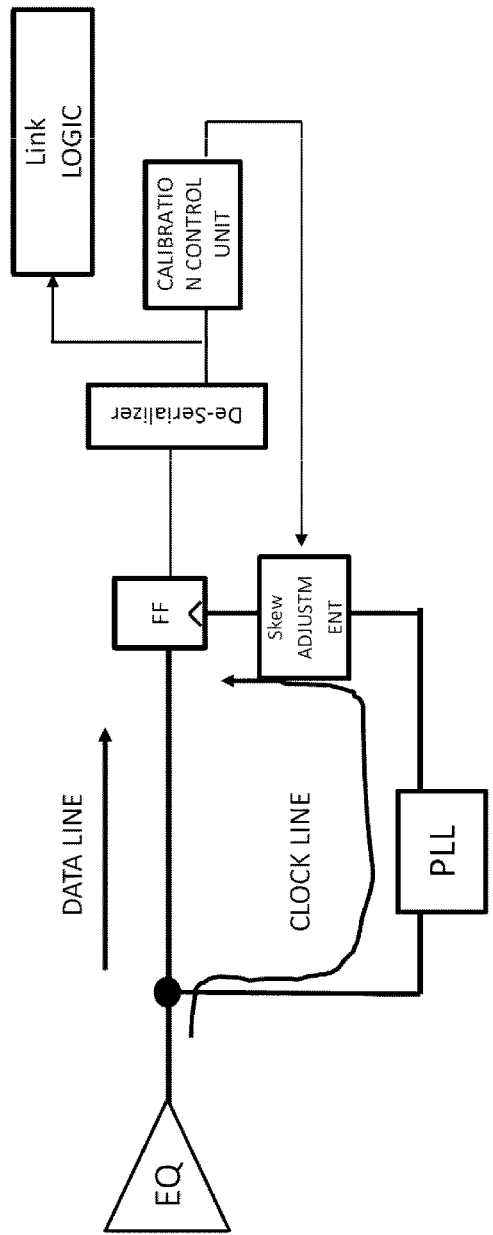
FIG. 14 is a diagram for describing a concept of skew calibration control of a CDR circuit.
Figure 15:
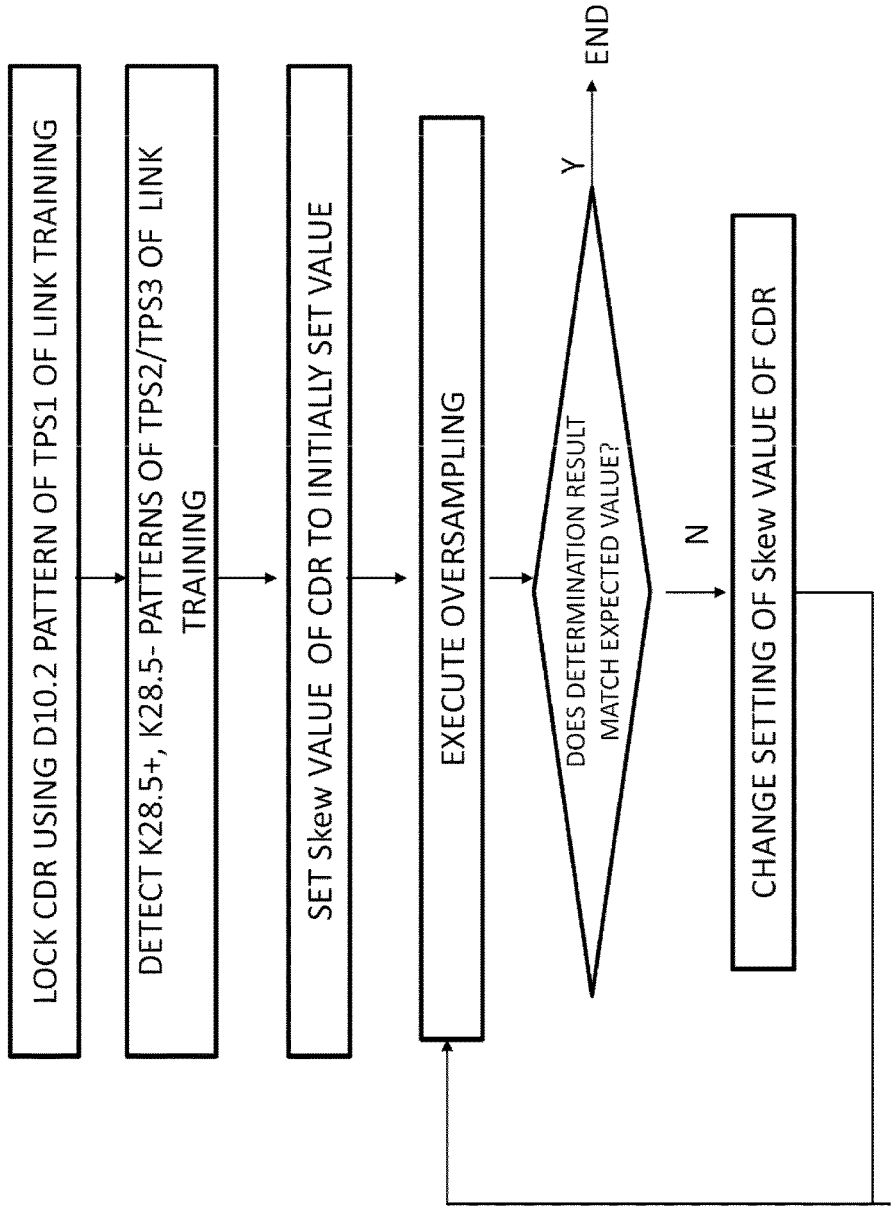
FIG. 15 is a diagram for describing an execution flow of the skew calibration control of the CDR circuit.

In the third embodiment, a delay (timing skew) between a data signal and a clock signal is adjusted in the eDP immediately after completing the locking of the CDR circuit in Step 1 and the calibration of the gain value of the equalizer circuit in the link training sequence as illustrated in FIGS. 14 and 15, for example. In addition, the data reception device 1 further includes a skew adjustment circuit 14 as illustrated in FIG. 1 and the like. The skew adjustment circuit 14 is a circuit that adjusts a shift amount (skew amount) between the input signal and the clock signal in the sampler 16 by adjusting a timing at which the clock signal recovered by the PLL type CDR circuit 12 reaches the sampler 16 (flip-flop) under the control of the calibration control unit 15 during the normal operation.

More specifically, the gain value of the equalizer circuit is set to be the optimum value by performing the calibration, and thus, a state is formed in which the equalizer circuit performs output in the state as illustrated in FIG. 7. FIG. 7 illustrates an example where the gain setting value of the equalizer circuit is appropriate and the waveform of the input signal has been correctly shaped. In this state, a sampling edge of the clock signal is present near a central portion of one bit of data if the clock signal to be sampled is T3 illustrated in FIG. 7, and thus, a margin between a setup time and a hold time becomes the maximum.

A flow in the case of selecting the clock signal of T3 illustrated in FIG. 7 will be described as follows. The equalizer output waveform of K28.5 is sampled with the clock signal of T1, which is the earliest in time, using the oversampler 13 and input data having a code pattern of "111101" is obtained as illustrated in FIG. 7. Next, switching to T2, the result of "111101" is obtained in the same manner. Further, switching the clock sequentially to T3, T4 and T5, the result of "111101" is obtained in the same manner up to the time T5 which is the latest in time. From these five sampling results, it is understood that the sampling result of T3 is positioned at the midst among the sampling results of T1 to T5. That is, the sampling edge of the clock signal is present near the central portion of one bit of data if the clock signal sampled by the CDR circuit during the normal operation is the timing (phase) of "T3" illustrated in FIG. 7, and thus, the margin of the setup time and the hold time is maximized, in the state where the gain value of the equalizer circuit is optimized. Therefore, the calibration control unit 15 sends the phase value of T3 as the sampling result of T3 to the skew adjustment circuit 14 as a recovery clock skew setting control signal. Then, the skew adjustment circuit 14 compares the phase of T3 received from the calibration control unit 15 with the phase of the clock signal recovered by the CDR circuit 12, and adjusts the phase of the recovered clock signal to match the phase of T3 when the phase of the recovered clock signal is shifted from the phase of T3. Accordingly, the skew adjustment circuit 14 can avoid generation of hold time violation and setup time violation in the sampler 16 (flip-flop).

In this manner, it is possible to optimize the gain value of the equalizer circuit by effectively utilizing the oversampling and circuit resources of the calibration control unit, configured to perform the calibration of the gain value of the equalizer circuit, and to perform adjustment of the delay (timing skew) between the data signal and the clock signal.

Further, one characteristic is that the skew adjustment circuit 14 is provided at the output side of the CDR circuit 12 as illustrated in FIGS. 1 and 14. When the skew adjustment circuit 14 is provided at the subsequent stage of the CDR circuit 12 in this manner, it is possible to make the data signal and the clock signal match each other only by adjusting the output signal from the CDR circuit 12 by the skew adjustment circuit 14. That is, it is not necessary to adjust the setting of the CDR circuit 12 at the time of adjusting the data signal and the clock signal. Accordingly, it is possible to use the CDR circuit 12 without changing the state thereof even in the case of performing skew adjustment control in the present invention, and thus, it is possible to simplify the skew adjustment control and to follow the shift amount between the data signal and the clock signal that changes from moment to moment.

[Fourth Embodiment of Present Invention]

Figure 16:
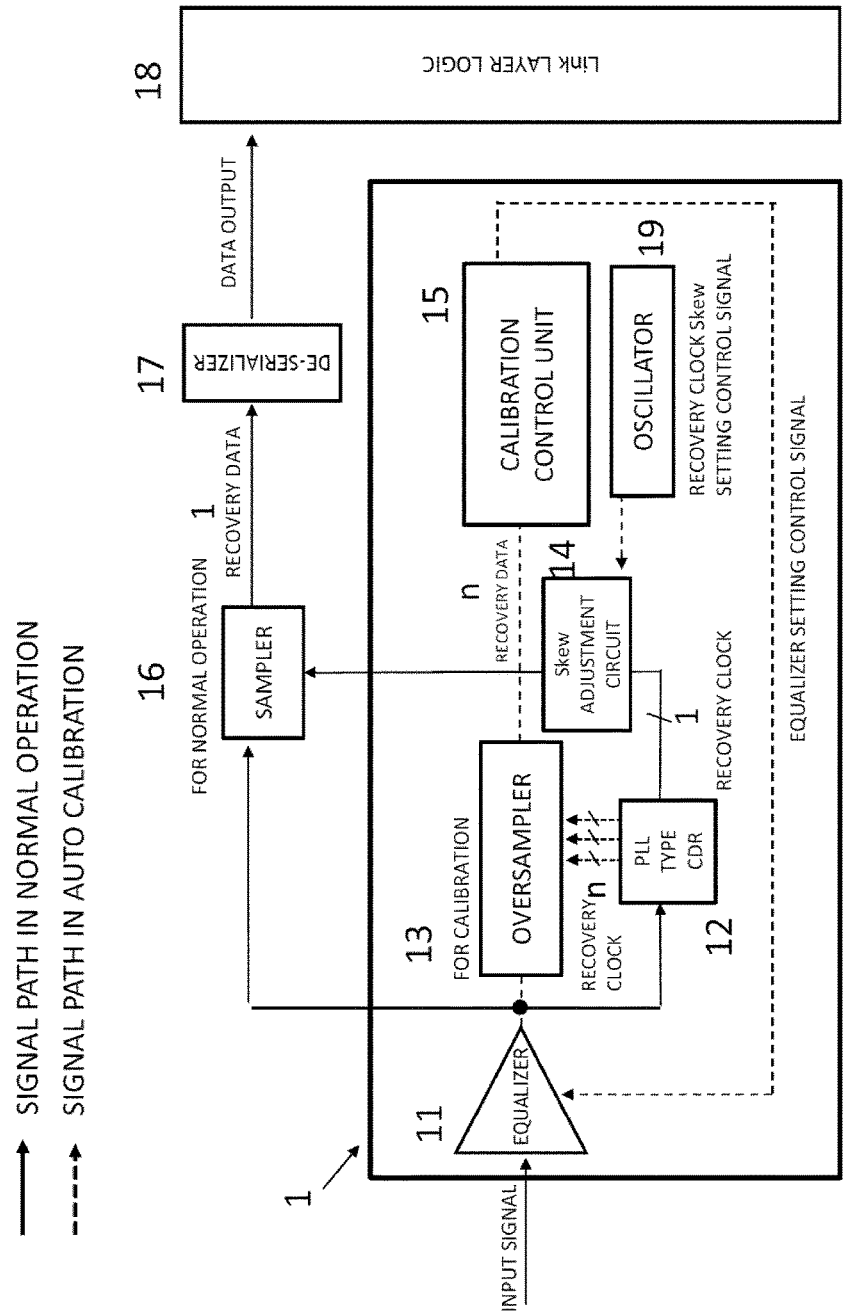
FIG. 16 is a block diagram illustrating a configuration of a data reception device according to another embodiment of the present invention.
Figure 17:
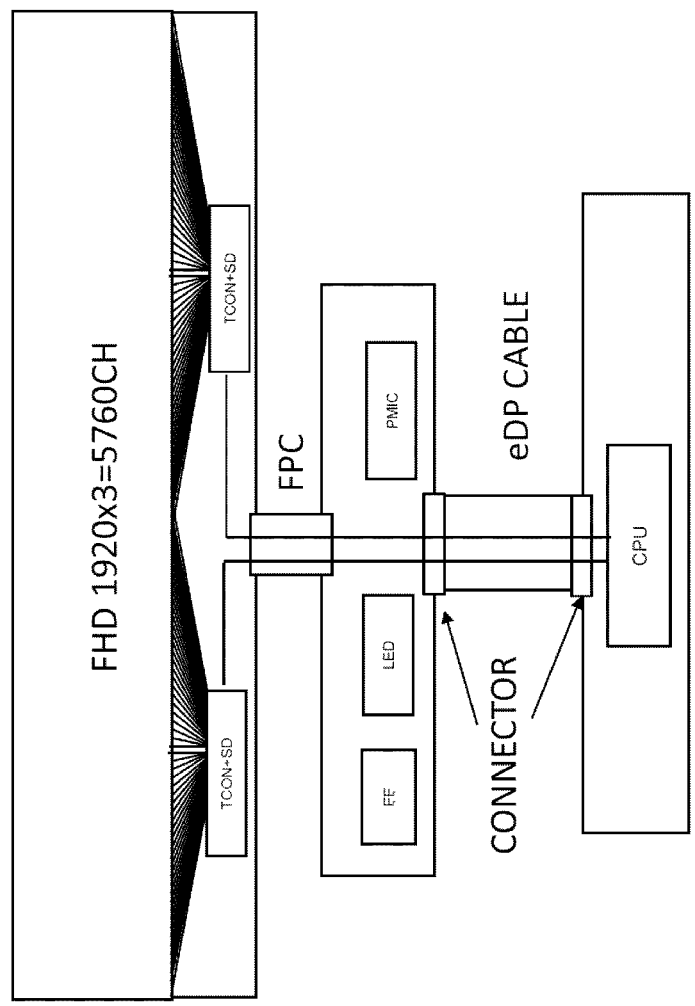
FIG. 17 is a block diagram illustrating an overall configuration of a display module integrated with a timing controller and a source driver which is the most applicable to the embodiment of the present invention.
Figure 18:
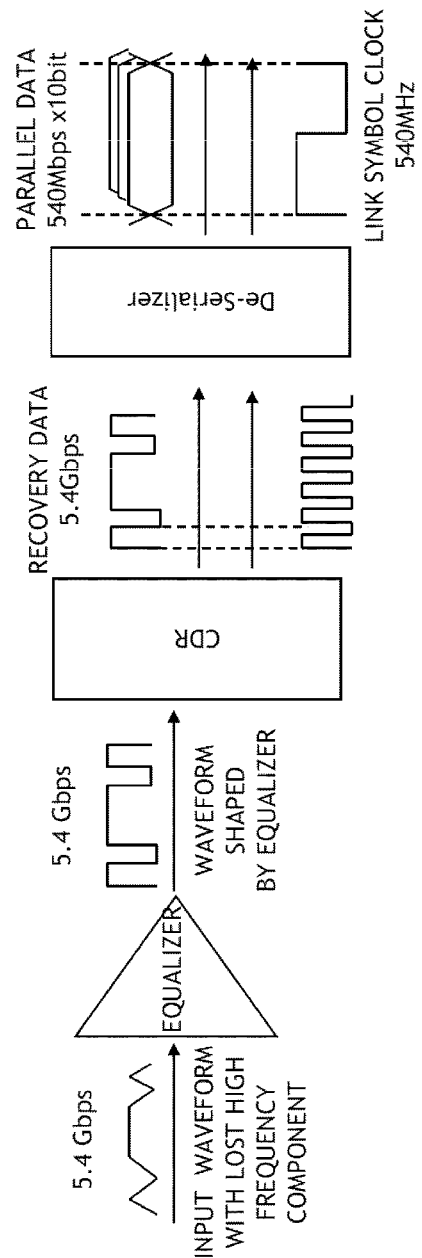
FIG. 18 is an overall view of an analog front-end unit in a reception circuit of a high-speed serial interface such as an eDP and a mipi.
Figure 19:
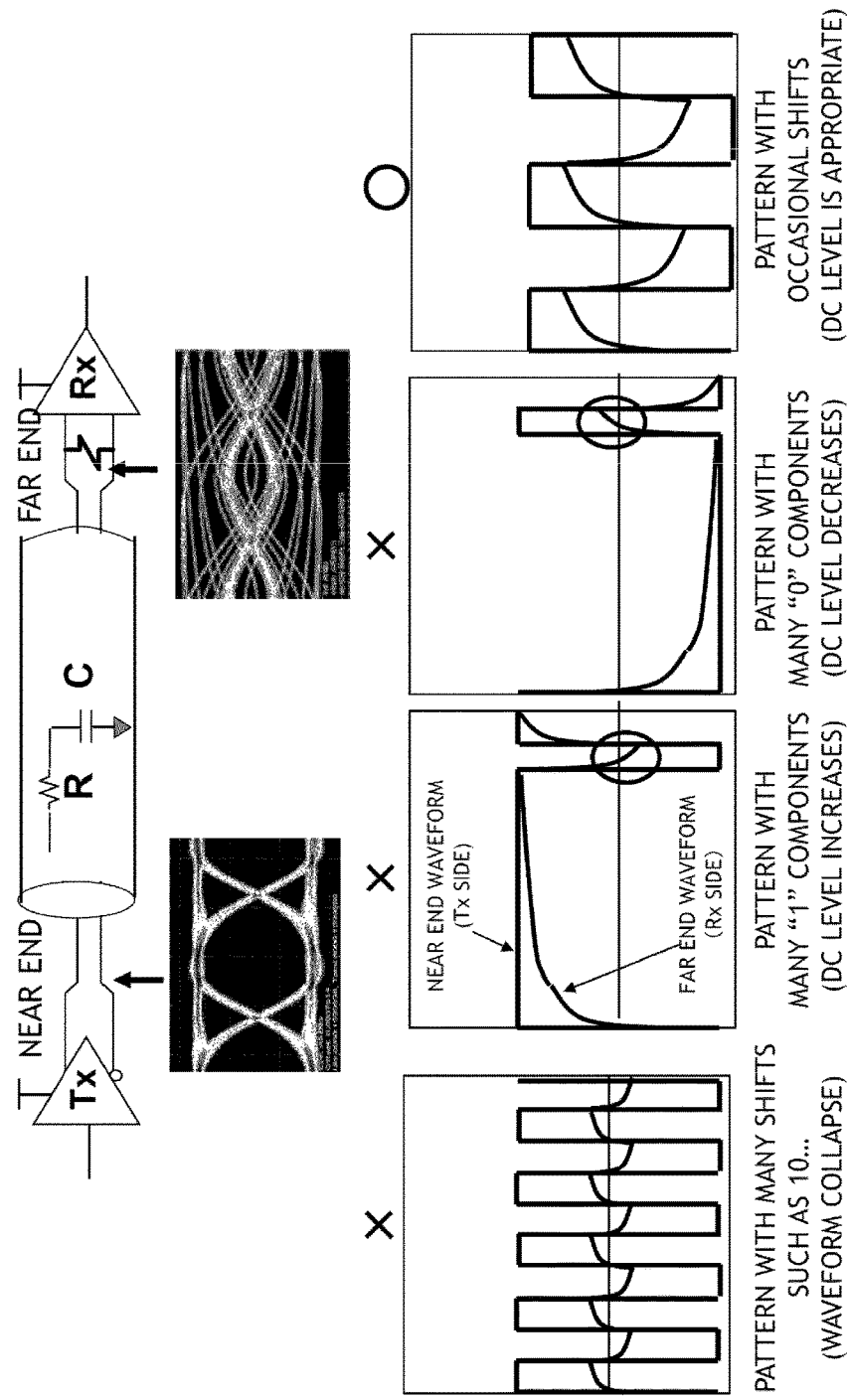
FIG. 19 is a diagram for describing that a waveform changes at a receiving end according to a code pattern of input data.
Figure 20:
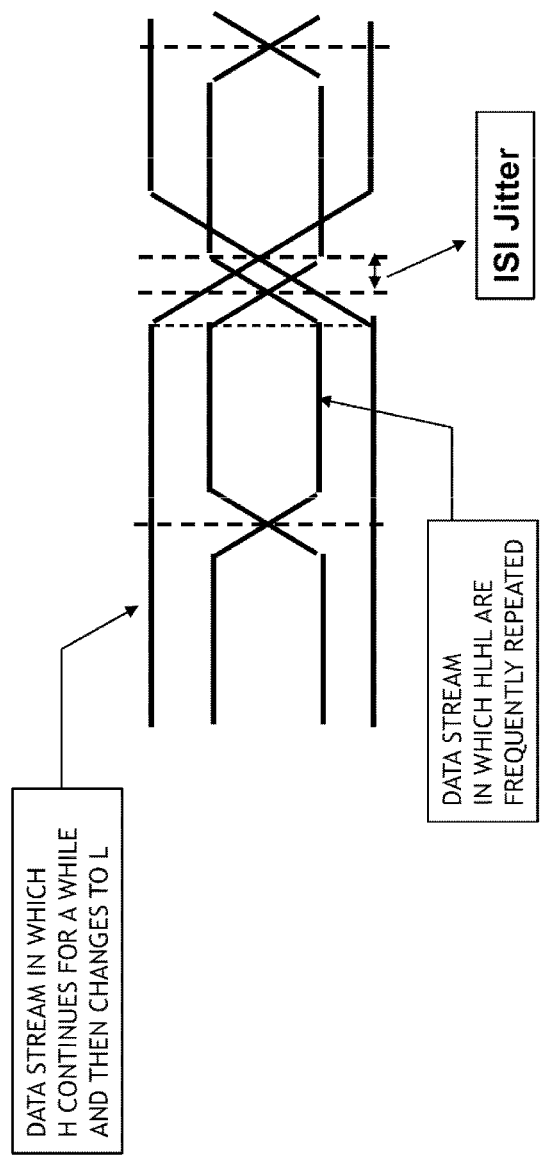
FIG. 20 is a diagram for describing that a waveform changes at the receiving end according to a code pattern of input data.

A fourth embodiment of the present invention will be described with reference to FIG. 16. The fourth embodiment of the present invention is given as follows. The oversampling is performed by the oversampler 13 in the third embodiment. In the present embodiment, however, a ring oscillator 19 which performs self-oscillation is built in the data reception device 1, and it is determined whether manufacturing variations in semiconductor, voltage fluctuations, and temperature fluctuations are on a low-speed side, on a high-speed side, or on a medium-speed side by monitoring an oscillation frequency as illustrated in FIG. 16. If the oscillation frequency of the oscillator 19 is on the high-speed side, the skew adjustment circuit 14 determines that a delay of data is advanced and adjusts a position of a sampling clock so as to match such a delay. When the oscillation frequency of the oscillator 19 is on the low-speed side, the skew adjustment circuit 14 determines that the delay of the data is delayed and adjusts the position of the sampling clock so as to match such a delay. If the oscillation frequency of the oscillator 19 is on the medium-speed side, the skew adjustment circuit 14 may use a default setting value.

The embodiments of the present invention have been described as above with reference to the drawings in the specification of the present application in order to express the content of the present invention. According to the present invention, it is possible to dynamically control the gain level of the equalizer and the timing skew value between the clock of the CDR and the data, thereby enabling the high-speed operation. Moreover, particularly, it is possible to implement high-speed operation of a single-chip system driver which needs to operate on a glass by providing a mechanism that dynamically controls the equalizer gain of an analog front-end unit inside a receiver circuit, such as the eDP and the mipi, and the skew of the CDR. This makes it possible to achieve the lower power consumption and the lower cost of the liquid crystal panel module and the like. However, the present invention is not limited to the above-described embodiments, and encompasses obvious modifications and improvements made by those skilled in the art based on the matters described in the specification of the present application. Further, the eDP has been exemplified in the description of modes of the invention, but the same effect can be obtained by replacing the eDP with the mipi. In the invention, the input interface to the timing controller is not limited merely to the eDP.

The present invention can be suitably used in electrical equipment industry. In particular, an image communication apparatus of the present invention can be suitably used as a module for image communication incorporated in a thin panel including a liquid crystal panel.

| | |
|---|---|
| 1 DATA RECEIVING CIRCUIT | 11 EQUALIZER CIRCUIT |
| 12 PLL TYPE CDR CIRCUIT | 13 OVERSAMPLER |
| 14 SKEW ADJUSTMENT CIRCUIT | 15 CALIBRATION CONTROL UNIT |
| 16 SAMPLER | 17 DE-SERIALIZER |
| 18 LINK LAYER LOGIC | 19 OSCILLATOR |

What is claimed is:

1. A data reception device comprising:
    an equalizer circuit which shapes a waveform of an input signal according to a set gain value;
    a CDR circuit which recovers a plurality of clock signals having different phases in one cycle from the input signal after being subjected to the waveform shaping performed by the equalizer circuit during a calibration operation and recovers one clock signal from the input signal after being subjected to the waveform shaping performed by the equalizer circuit during a normal operation;
    an oversampler which performs multiple sampling of the waveform-shaped input signal in synchronization with the plurality of clock signals at once and recovers a plurality of input data from the waveform-shaped input signal during the calibration operation;
    a calibration control unit which determines whether the oversampler correctly recovers the input data based on a result of the sampling performed by the oversampler, and generates a control signal to set the gain value of the equalizer circuit based on a determination result when it is determined that the input data is not correctly recovered during the calibration operation; and
    a skew adjustment circuit which adjusts a shift amount between a phase of the input signal after being subjected to the waveform shaping performed by the equalizer circuit and a phase of the one clock signal recovered by the CDR circuit during the normal operation,
    wherein the calibration control unit decides a predetermined phase based on the result of the sampling performed by the oversampler and sends control information on the predetermined phase to the skew adjustment circuit, and
    the skew adjustment circuit adjusts the phase of the one clock signal recovered by the CDR circuit so as to match the predetermined phase of the control information received from the calibration control unit.

2. The data reception device according to claim 1, wherein the CDR circuit has a voltage-controlled oscillation circuit having a loop circuit in which a plurality of logic inversion elements are connected in series, and
    the voltage-controlled oscillation circuit outputs the plurality of clock signals having different phases in one cycle.

3. The data reception device according to claim 2, wherein the oversampler includes:
    a clock selector, which is connected to the plurality of logic inversion elements and activates any one of the plurality of logic inversion elements to receive input of a clock signal; and
    a flip-flop which is connected to the equalizer circuit and the clock selector.

4. The data reception device according to claim 2, wherein the oversampler includes a plurality of flip-flops connected to each of the equalizer circuit and the plurality of logic inversion elements.

5. The data reception device according to claim 2, wherein the oversampler includes a clock selector, which receives input of the clock signal via a delay device connected to the voltage-controlled oscillation circuit, and a flip-flop which is connected to the equalizer circuit and the clock selector.

6. The data reception device according to claim 1, wherein the calibration control unit is caused to generate the control signal to set the gain value of the equalizer circuit based on the determination result when it is determined that the oversampler is not correctly recovered the input data by periodically shifting to the calibration operation even after the calibration operation is shifted to the normal operation.

* * * * *